United States Patent [19]
Kalsi et al.

[11] Patent Number: 5,738,358
[45] Date of Patent: Apr. 14, 1998

[54] EXTRUSION RESISTANT HYDRODYNAMICALLY LUBRICATED MULTIPLE MODULUS ROTARY SHAFT SEAL

[75] Inventors: Manmohan S. Kalsi, Houston; Lannie Dietle, Sugar Land, both of Tex.

[73] Assignee: Kalsi Engineering, Inc., Sugar Land, Tex.

[21] Appl. No.: 582,086

[22] Filed: Jan. 2, 1996

[51] Int. Cl.$^6$ ................................. F16J 15/32
[52] U.S. Cl. ................... 277/544; 277/556; 277/559; 277/584; 277/926
[58] Field of Search ...................... 277/134, 152, 277/165, 188 R

[56] References Cited

U.S. PATENT DOCUMENTS

| | | | |
|---|---|---|---|
| 930,230 | 8/1909 | Rhodes | 277/121 |
| 2,679,441 | 5/1954 | Stillwagon | 277/188 R |
| 2,998,288 | 8/1961 | Newhouse | 277/165 |
| 3,381,970 | 5/1968 | Brown | 277/165 |
| 3,627,337 | 12/1971 | Pippert | 277/206 |
| 3,901,517 | 8/1975 | Heathcott | 277/205 |
| 3,909,016 | 9/1975 | Traub et al. | 277/165 |
| 3,921,987 | 11/1975 | Johnston et al. | 277/134 |
| 3,942,806 | 3/1976 | Edlund | 277/165 |
| 4,484,753 | 11/1984 | Kalsi . | |
| 4,610,319 | 9/1986 | Kalsi . | |
| 4,917,390 | 4/1990 | Lee et al. | 277/165 |
| 5,195,754 | 3/1993 | Dietle . | |
| 5,230,520 | 7/1993 | Dietle et al. . | |
| 5,306,021 | 4/1994 | Morvant | 277/188 R |
| 5,433,452 | 7/1995 | Edlund et al. | 277/165 |

FOREIGN PATENT DOCUMENTS

| | | | |
|---|---|---|---|
| 1166648 | 11/1958 | France | 277/165 |
| 1574959 | 6/1990 | U.S.S.R. | 277/165 |
| 759233 | 10/1956 | United Kingdom | 277/165 |

OTHER PUBLICATIONS

*Seals and Sealing Handbook*, Gulf Publishing Co., Houston, TX., 1981, p. 171.

Seals and Sealing Handbook, pp. 177, Gulf Publishing Co., Houston, TX., 1981.

*Primary Examiner*—William A. Cuchlinski, Jr.
*Assistant Examiner*—John L. Beres
*Attorney, Agent, or Firm*—Bush, Riddle, & Jackson L.L.P.

[57] ABSTRACT

A hydrodynamically lubricated interference type rotary shaft seal suitable for environmental exclusion and high pressure lubricant retention which incorporates composite multiple modulus construction and a non-planar flexible environmental edge heel geometry which cooperate to resist high pressure extrusion damage while minimizing interfacial contact pressure and accommodating radial shaft motion.

28 Claims, 9 Drawing Sheets

EXTRUSION RESISTANT HYDRODYNAMICALLY LUBRICATED MULTIPLE MODULUS ROTARY SHAFT SEAL

FIELD OF THE INVENTION

This invention relates generally to hydrodynamically lubricated type rotary shaft seals that are suitable for environmental exclusion and for maintaining a film of lubricant at the dynamic interface of such seals with a rotary shaft surface. More particularly the present invention is directed to hydrodynamically lubricated rotary shaft seals that are suitable for environmental exclusion from the dynamic interface and are also suitable for high pressure lubricant retention through employment of multiple modulus construction and extrusion resistant geometry.

BACKGROUND OF THE INVENTION

Industry has found many uses for the hydrodynamically lubricated, ring shaped interference type rotary shaft seals, also referred to herein as "hydrodynamic seals" or "hydrodynamically lubricated seals", embodying the principles set forth in U.S. Pat. Nos. 4,610,319 and 5,230,520 and marketed by Kalsi Engineering, Inc. of Sugar Land, Tex. under the registered trademark, Kalsi Seals. Hydrodynamic seals are used to provide lubricant retention and contaminant exclusion in harsh environments, such as the oil field drilling environment. Present commercial oil field applications include rotary cone rock bits, downhole drilling mud motors, high speed-high pressure coring swivels, rotating drilling heads, and rotating blowout preventers. All references herein to hydrodynamically lubricated seals or hydrodynamic seals are directed to seals embodying the principles of the above identified U.S. Patents.

FIGS. 1, 2, 2A, 3 and 4 of this specification represent prior art which is discussed herein to enhance the readers' understanding of the distinction between prior art hydrodynamic seals and the present invention.

Referring now to the prior art of FIG. 1 there is shown a cross-sectional view of a hydrodynamically lubricated interference type rotary shaft sealing assembly generally at 1 including a housing 2 from which extends a rotary shaft 3. The housing defines an internal seal installation groove or gland 4 within which is located a ring shaped hydrodynamic Kalsi Seals rotary shaft seal 5 which is constructed in accordance with the principles of the above mentioned patents and which is shown in greater detail in FIGS. 2, 2A and 3. The hydrodynamic seal is used to separate the lubricant 6 from the environment 7, and to prevent intermixing of the lubricant and the contaminant matter present within the environment.

FIG. 2 represents the radially uncompressed cross-sectional shape of the prior art seal 5, FIG. 2A represents the cross-sectional configuration of the prior art seal 5 when located within its seal groove and radially compressed between the outer diameter 14 of the rotary shaft 3 and the radially outer wall 11 of the seal groove, and FIG. 3 shows the footprint made by the dynamic sealing lip 12 against the shaft. The environment usually contains highly abrasive particulate matter in a fluid; an example of such an environment would be oil field drilling fluid. From an overall orientation standpoint, the end of the seal which is oriented toward the lubricant is surface 8 and the end of the seal which is oriented toward the environment 7 is surface 9. When the seal 5 is installed in the circular seal groove or gland 4, a circular radially protruding static sealing lip or projection 10 is compressed against a counter-surface 11 of the groove per the teachings of U.S. Pat. No. 5,230,520. At the inner periphery of the circular sealing element 5 there is provided an inner circumferential sealing lip 12 that defines a dynamic sealing surface 13 that is compressed against a counter-surface 14 of the rotatable shaft 3. The circular seal groove or gland 4 is sized to hold the resilient circular sealing element 5 in radial compression against the cylindrical sealing surface 14 of the shaft 3, thereby initiating a static seal with the housing and shaft in the same manner as any conventional interference type seal, such as an O-Ring. When shaft rotation is not present, a liquid tight seal is maintained at the static sealing interface between the static sealing lip 10 and the mating counter-surface 11 of the seal groove, and between the dynamic sealing lip 12 and the counter-surface 14 of the shaft.

When shaft rotation takes place, the hydrodynamic seal remains stationary with respect to the housing, and maintains a static sealing interface with said housing, while the seal-to-shaft interface becomes a dynamic sealing interface. The inner peripheral surface of the seal inner lip 12 incorporates a geometry that promotes long seal life by hydrodynamically lubricating the dynamic seal-to-shaft interfacial zone, and by excluding environmental contaminates from the seal to shaft interface. Seal lip 12 incorporates a wavy edge 15 on its lubricant side, and an abrupt circular edge 16 on its environmental side per the teachings of U.S. Pat. No. 4,610,319. For the purpose of orienting the reader, the radial cross-section of FIGS. 2 and 2A is taken at a circumferential location which represents the average width of the wavy dynamic sealing lip contact shown in FIG. 3. As relative rotation of the shaft takes place, the wavy edge 15 on the lubricant side of the dynamic sealing lip, which has a gradually converging relationship with the shaft in the axial and circumferential directions, generates a hydrodynamic wedging action that introduces a lubricant film between the seal inner surface 13 and the counter-surface 14 of the shaft per the teachings of U.S. Pat. No. 4,610,319. This lubricant film physically separates the seal and the shaft, and thereby prevents the typical dry rubbing type frictional wear and heat damage associated with conventional non-hydrodynamic interference type seals, and thereby prolongs seal life and mating shaft surface life and makes higher service pressures practical. This hydrodynamic action, which is described in detail in U.S. Pat. No. 4,610,319, can more easily be understood by referring to FIG. 3, which shows a flat development of the cylindrical sealing surface 14 of the shaft, and which depicts the footprint of the dynamic inner lip 12 of the seal against the sealing surface 14 of the shaft. From an orientation standpoint, the lubricant is shown at 6, the seal footprint is shown at 17, and the environment is shown at 7. The lubricant side of the footprint has a wavy edge 18 created by the wavy edge 15 of the seal, and the mud side of the footprint has a straight edge 19 created by the abrupt circular corner 16 of the seal. The lubricant is pumped into the dynamic sealing interface by the normal component VN of the rotational velocity V.

Referring again to FIG. 2 and FIG. 2A, the abrupt circular corner 16 of the environmental side of the seal is not axially varying, and does not generate a hydrodynamic wedging action with the environment in response to relative rotary motion, and thereby functions to exclude particulate contaminants from the seal-to-shaft interface per the teachings of U.S. Pat. No. 4,610,319. The illustration of FIGS. 2 and 2A illustrates the customary type of general purpose hydrodynamic rotary shaft seal that positions and configures the exclusionary edge 16 and the environmental end 9 of the seal 5 in such a manner that lip 12 is largely supported by the environment-side gland wall 20 in a manner that resists distortion and extrusion of seal material when the seal is subjected to the hydrostatic force resulting from the lubricant pressure acting over the annular area between the static sealing interface and the dynamic sealing interface. Such force occurs when the lubricant pressure is higher than the environment pressure. FIGS. 1, and 2A illustrate the seal being forced against the environment-side gland wall 20 by hydrostatic force resulting from the lubricant pressure acting over the area between the static sealing interface and the dynamic sealing interface.

The static sealing lip 10 has generally the same cross-sectional geometry as the average cross-sectional configuration of the dynamic sealing lip 12 except that it is shorter. Because both lips have the same general shape and axial location, when the seal is compressed, the interfacial contact force profiles and deformation of the two lips are very similar in both their magnitude and axial location per the teachings of U.S. Pat. No. 5,230,520, and as a result, there is no gross tendency for the seal to twist counter-clockwise within the gland in the absence of lubricant pressure. The magnitude of projection 21 is designed so that lip 10 is essentially flattened out against mating counter-surface 11 of the gland upon installation so that contact between the outer periphery of the seal and the gland surface provides mechanical stability against seal twisting in unpressurized applications. The magnitude of projection 22 is designed to be larger than projection 21 so that dynamic lip 12 is not overly flattened and deformed against the shaft upon installation so as to preserve the form and function of the hydrodynamic inlet geometry 15.

DESCRIPTION OF THE PROBLEM

When a condition of elevated lubricant pressure exists, the hydrostatic force resulting from the lubricant pressure acting over the area between the static sealing interface and the dynamic sealing interface drives the seal against the environment side gland wall, as shown by FIG. 2A. The abrupt circular exclusion edge 16 is located at the extreme end of the environmental side of the seal. Since the shape of the environmental end of the seal is of the same planar shape as the environmental gland wall, the environmental end of the seal is generally well supported against the lubricant pressure at all locations except clearance gap 26 which exists between the housing 2 and shaft 3. This clearance gap, which is commonly called the "extrusion gap", must be kept relatively small so that the relatively low modulus seal material can bridge the gap and resist the force resulting from the lubricant pressure acting over the unsupported area of the extrusion gap. At some level of elevated lubricant pressure, the portion of the seal adjacent to extrusion gap 26 begins to locally bulge or protrude in to the extrusion gap. This phenomenon is commonly called "extrusion" by the seal industry, and is inherent to interference type seals, including the Kalsi Seals rotary shaft seal. (Extrusion is not illustrated in FIG. 2A.)

The magnitude of extrusion is directly dependent upon several factors, including the size of the extrusion gap, the lubricant pressure, and the modulus of the seal material. The modulus of the seal material decreases with temperature, which reduces extrusion resistance. In high pressure sealing applications, extrusion can lead to severe fatigue damage known as "nibbling" or "extrusion damage", which can cause seal material loss and thereby significantly reduce the operational life of the seal. Extrusion damage is caused by cyclic stressing of the seal material which protrudes into the extrusion gap, which ultimately causes the protruding material to fatigue and break away from the sealing element. The cyclic stress which causes extrusion damage is induced by several factors described here-after. Dynamic fluctuations in the size of the extrusion gap due to lateral shaft motion (and other factors) causes high variations in the radial compression of the extruded material, and the resulting cyclic stress causes extrusion damage which looks as if tiny bites have been "nibbled" out of the environmental side of the seal. Lubricant pressure fluctuations cause cyclic stress induced extrusion damage by causing fluctuations in the magnitude of extrusion, and by causing fluctuations in the size of the extrusion gap due to "breathing" (pressure related expansion and contraction) of the housing. Experience has shown that extrusion damage is significantly accelerated by the presence of roughness (such as nicks, burrs, or poor surface finish) at the intersection 27 between the environmental side gland wall 20 and the housing bore 28, because said roughness causes the extruded material to incur a high local stress concentration that accelerates fatigue damage. Extrusion related fatigue damage to the environmental side of the seal can cause eventual seal failure by several different mechanisms. In severe cases, the seal fails catastrophically due to gross material loss. In less severe cases, localized nibbling can promote the ingestion of environmental abrasives into the dynamic interface and cause eventual seal failure due to wear, and can also partially interrupt the hydrodynamic film which may cause the seal to run hotter and suffer from premature compression set and heat-related surface embrittlement.

Although the useful operating pressure range of the present day hydrodynamic rotary shaft seal is unequaled by any other interference type rotary seal, the pressure range is ultimately limited by susceptibility of support means which may be in the form of a seal to extrusion damage. Several applications, such as the oilfield rotary blowout preventer, the oilfield downhole drilling mud motor, and pumps for abrasive slurries, would benefit significantly from a rotary seal having the ability to operate at a higher pressure, or having the ability to operate with a larger shaft to housing extrusion gap and tolerate larger lateral shaft motion. Unfortunately, one cannot simply increase the overall durometer hardness of the hydrodynamic seals rotary shaft seal to a very high value to obtain the high modulus needed for increased extrusion resistance because under initial radial compression the high modulus would cause a very high contact pressure at the dynamic sealing interface that would be incompatible with sustained rotary operation due to a high resulting level of self-generated heat. The contact pressure at the seal to shaft interface is one of the most important factors relating to hydrodynamic performance of the seal because it influences film thickness. As previously stated, hydrodynamic seals are installed with initial radial compression to establish a static seal in the same manner as an O-Ring. A certain minimum level of initial compression is required so that the seal can accommodate normal tolerances, eccentricities, shaft lateral displacement, and seal compression set without loosing contact with the shaft. The contact pressure at the dynamic sealing interface is a function of the percentage of compression times the modulus of elasticity of the seal material, therefore the choice of modulus is limited by the required percentage of initial compression and by the maximum practical interfacial contact pressure. In practice, this has meant that the prior art hydrodynamic seal has been restricted to materials having a durometer hardness of about 90 Shore A, which corresponds to a modulus of elasticity of about 2,600 psi.

The small seal to shaft extrusion gap clearance required for high pressure operation with present day hydrodynamic seals is difficult to implement unless special mechanical contrivance such as the force-balanced laterally translatable seal carrier of U.S. Pat. No. 5,195,754 is used. Shaft elastic deflection and lateral articulation within bearing clearances due to side load often exceed the required seal to housing extrusion gap, and the resulting rotary metal to metal contact between the shaft and the housing damages the shaft and housing and generates frictional heat that can melt the seal and cause failure. An interference type hydrodynamically lubricated rotary shaft seal having higher extrusion resistance so as to be able to tolerate larger extrusion gaps and increased lateral shaft motion is therefore highly desirable.

Another alternate embodiment of prior art hydrodynamic seals is the hydrodynamic seal 30 illustrated in FIG. 4 which is used in roller cone drill bits. The prior art seal 30 defines a static sealing surface 32 which contacts against a mating counter-surface 50 of the gland 52, and defines an environmental side 34 which faces the drilling fluid of the environment, and defines a lubricant side 36 which faces the lubricant of the bit. The seal also includes a dynamic sealing lip 38 which defines a dynamic sealing surface 40 for contact with the shaft 41. The dynamic sealing lip has a hydrodynamic geometry 42 on the lubricant side and an abrupt circular exclusionary geometry 44 on the environmental side per the teachings of U.S. Pat. No. 4,610,319. The step 48 and laterally offset relationship between the environmental end of the seal 34 and the abrupt exclusionary geometry 44 is dictated by the need to clear a large shaft radius 46. The hydrodynamic bit seal 30 is used in substantially pressure balanced service where the lubricant pressure is approximately equal (within ±200 psi) to the environmental pressure. Although the bit seal 30 is suitable for applications where the lubricant pressure is nominally balanced to that of the environment, it is completely unsuitable for high lubricant pressure applications because the dynamic lip is not supported against deformation by the gland wall, and the modulus of the seal is limited to relatively low values by the above described need to limit interfacial contact pressure resulting from radial compression of the seal. If the bit seal 30 were exposed to high lubricant pressure, the seal would be driven to the environmental side gland wall 54. Owing to large step 48, initial seal contact with the gland wall would occur at a diameter which is substantially larger than the shaft sealing interface. The hydrostatic pressure acting over the relatively large unsupported area between the initial wall contact and the shaft contact would exert a large axial hydraulic force on the dynamic lip 38 of the seal, and as a result the lip 38 would undergo radical distortion as the lubricant pressure forced the lip toward the environment. Such gross distortion would prevent hydrodynamic lubrication of the dynamic interface, and would therefore result in rapid failure of the seal due to wear from direct unlubricated contact with the shaft, and due to rapid extrusion damage from severe heat-related softening of the elastomer. The laterally offset relationship between the environmental end of the seal 34 and the abrupt exclusionary geometry 44 of the hydrodynamic bit seal 30 is totally unsuitable for high pressure lubricant retention because the chamfer is so large, and because the modulus of the seal must be kept relatively low so that the interfacial contact pressure resulting from initial radial compression is kept within a useful range. Said low modulus material is incapable of resisting severe distortion when exposed to high lubricant pressure if not well supported by the gland.

SUMMARY OF THE INVENTION

The present invention is a hydrodynamically lubricated, interference type rotary shaft seal which, compared to the prior art, promotes cooler operation and provides increased extrusion resistance without a corresponding increase in interfacial contact pressure, thereby accommodating higher service pressure, increased shaft to housing clearance, and increased shaft lateral motion. The hydrodynamic rotary shaft seal of this invention is provided with a wavy shape on the lubricant side of the dynamic sealing lip for the purpose of hydrodynamic lubrication of the dynamic sealing interface, and has a non-axially varying shape on the environmental side of the dynamic sealing lip for the purpose of excluding contaminants. More specifically, the hydrodynamic seal of this invention is an improvement to the commercially available type of hydrodynamic rotary shaft seal which is manufactured and sold by Kalsi Engineering, Inc. of Sugar Land, Tex. under U.S. Pat. No. 4,610,319 and 5,230,520. The improved extrusion resistance of the present invention is accomplished by the cooperative benefits of a composite multiple modulus construction and a non-planar flexible environmental end heel geometry. The composite multiple modulus construction provides the extrusion resistance benefit of higher modulus materials without the usual associated penalty of high interfacial contact pressure. The dynamic sealing lip of the present invention is constructed wholly or in part from a relatively hard, relatively high modulus extrusion resistant material (such as a polymeric material, a high durometer elastomer, or reinforced material such as a fiber or fabric reinforced elastomer or a fiber glass or metal-particle reinforced plastic) so that the portion of the dynamic sealing lip closest to the shaft to housing extrusion gap resists extrusion under high pressure. Another larger integral portion of the seal is constructed wholly or in part from a relatively softer, low modulus, resilient material, such as a low durometer elastomer. When the seal is installed, it is placed in radial compression, and the contact pressure at the dynamic sealing interface is governed by the relatively low modulus of the relatively soft, resilient material rather than by the relatively high modulus of the relatively hard, extrusion resistant material of the dynamic sealing lip. The portion of the seal near the shaft to housing extrusion gap incorporates a transitional, non-planar circular flexible heel geometry between the planar environmental end of the seal and the cylindrical inner periphery of the dynamic sealing lip. Lubricant pressure causes this transitional geometry to flex toward the shaft to housing extrusion gap, rather than forcing it to extrude or bulge into the extrusion gap. As a result, the transitional geometry drapes between the housing environmental gland wall and the cylindrical surface of the shaft, and the generally unavoidable relative lateral motion between the housing and the shaft is absorbed over a relatively long distance by flexing of the transitional heel geometry. Since the relative shaft to housing lateral motion is absorbed over a relatively long distance, the resulting local stresses in the seal material are relatively low, and do not exceed the fatigue limit of the material used to form the dynamic sealing lip. Extrusion damage is therefore prevented, and integrity of the environmental end of the seal is therefore maintained.

Since the transitional, non-planar flexible heel geometry between the planar environmental end of the seal and the cylindrical inner periphery of the dynamic sealing lip is of non-axially varying nature, no hydrodynamic pumping activity can occur at the environmental end of the seal responsive to shaft rotation, which serves to prevent invasion of the dynamic sealing interface by environmental contaminants. Contaminant invasion of the dynamic sealing interface is also inhibited by an amplification of contact pressure at the environmental edge of the dynamic sealing interface; this amplification is induced by the lubricant pressure acting over the unsupported area of the transitional, non-planar flexible heel geometry. This contact pressure amplification is further enhanced by the abrupt intersection between the transitional, non-planar flexible heel geometry and the cylindrical inner periphery of the dynamic sealing lip.

Experiments conducted by the inventor and his associates have confirmed that the cooperative benefits of the composite multiple modulus construction and the non-planar flexible environmental end heel geometry provide a substantial increase in pressure retaining ability over the prior art. In these experiments, lubricant pressure of over 5000 psi has been successfully retained for hundreds of hours with practically no extrusion damage at rotary speeds which duplicate the shaft surface speed of the large shafts used in the oilfield rotary blowout preventer. Since rotary blowout preventers are now currently limited to about 2000 psi, it is anticipated that the present invention will provide the enabling technology for a new generation of advanced capability rotary blowout preventers which will have the potential of significantly reducing the cost of recovering domestic natural gas in an environmentally acceptable, safe, and reliable manner.

The present invention will also permit use of much higher extrusion gaps for lower pressure applications, thus permitting larger radial shaft motion to be accommodated in applications such as downhole mud motors, large slurry & mining pumps, etc.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings. It is to be noted, however, that the appended drawings only illustrate typical embodiments of this invention, and are therefore not to be considered limiting of its scope, for the invention admits to other equally effective embodiments.

IN THE DRAWINGS

Figure 1:
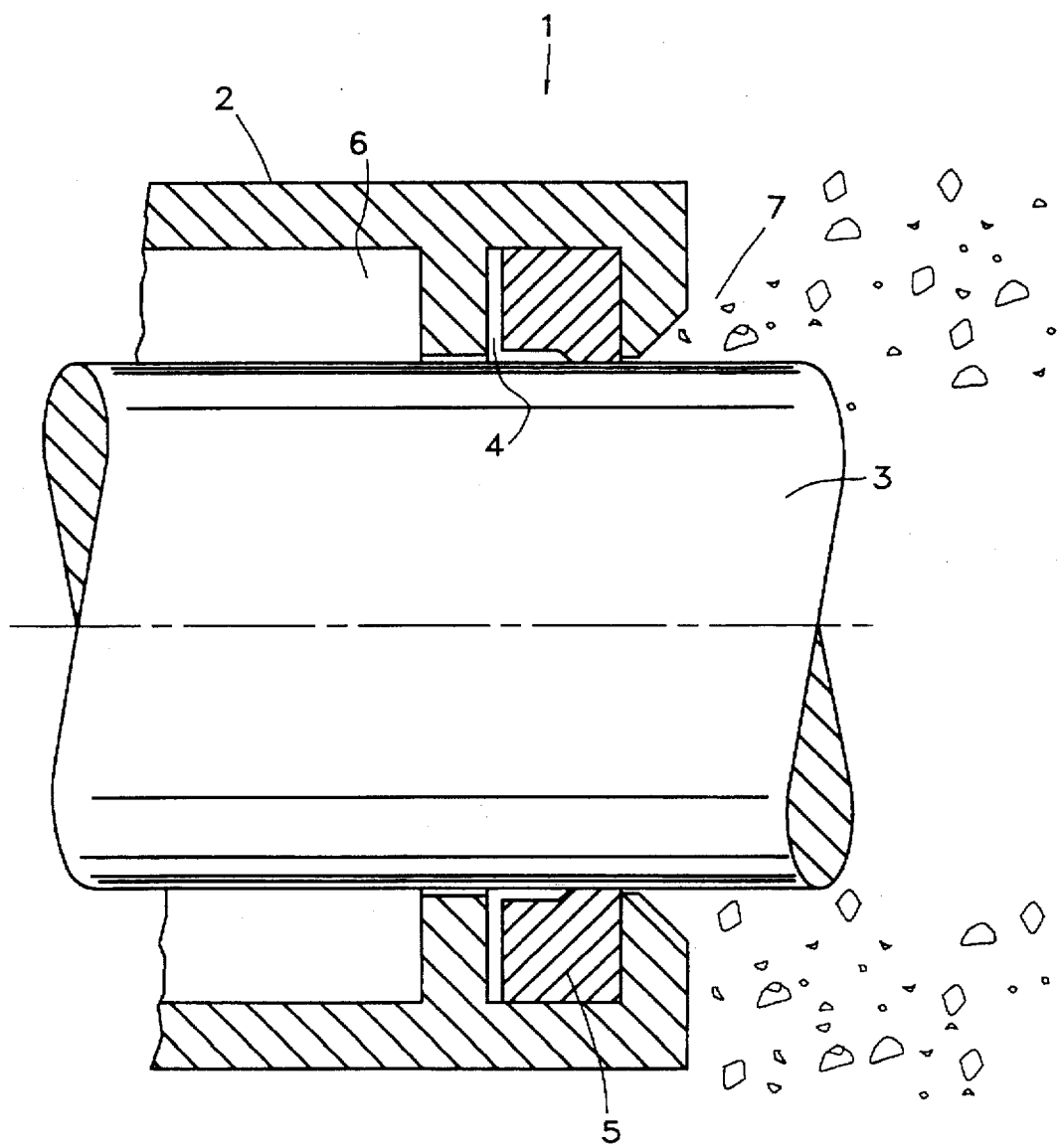

FIG. 1 is a partial cross-sectional illustration of a housing and rotary shaft arrangement incorporating a hydrodynamic seal representative of the prior art.

Figure 2:
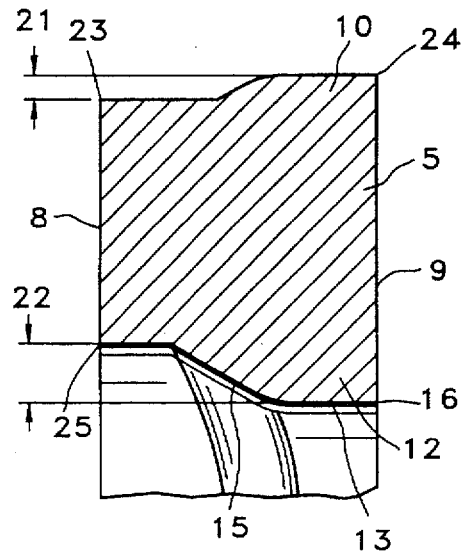
Figure 2A:
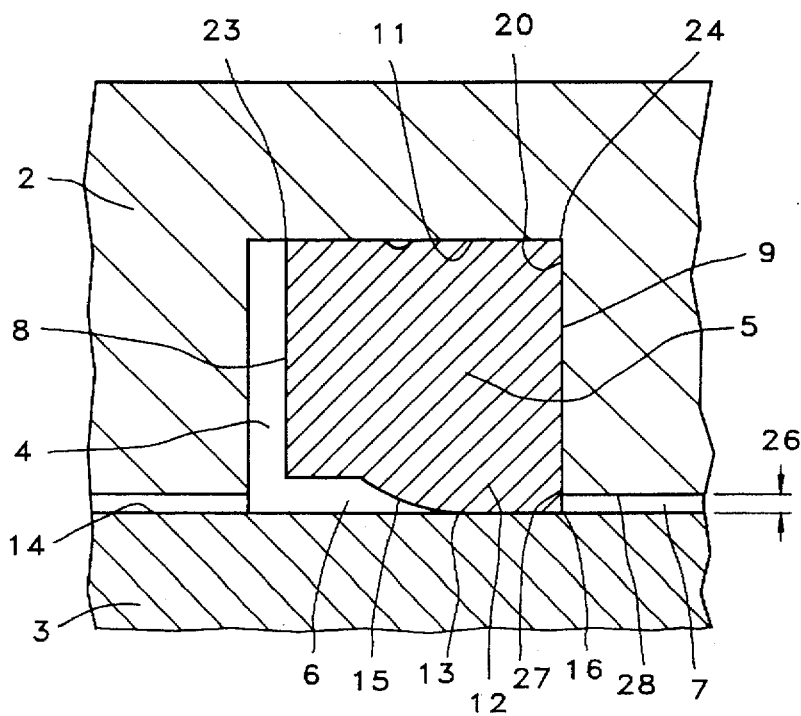

FIGS. 2 and 2A are fragmentary sectional views of a hydrodynamic seal representing the prior art, the seal being shown in the uncompressed condition thereof in FIG. 2, and shown in FIG. 2A to be located in radially compressed condition within a sealing gland and establishing hydrodynamic sealing engagement with a rotary shaft in the presence of lubricant pressure.

Figure 3:
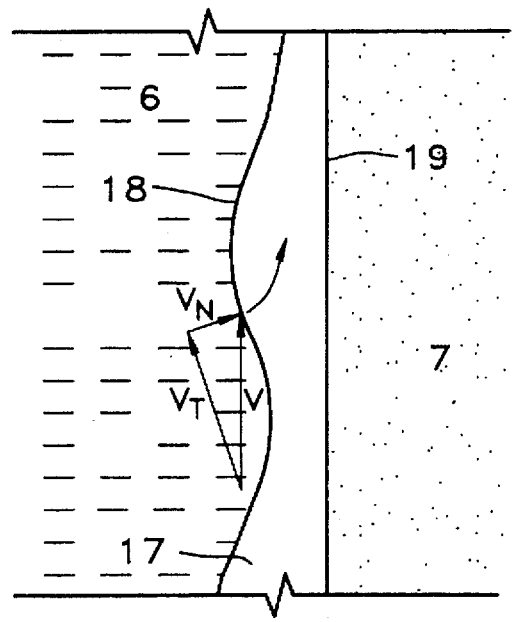

FIG. 3 is a flat development which represents the footprint configuration of the sealing interface of a hydrodynamic seal, and which illustrates the theoretical generation of the hydrodynamic wedging or pumping action thereof.

Figure 4:
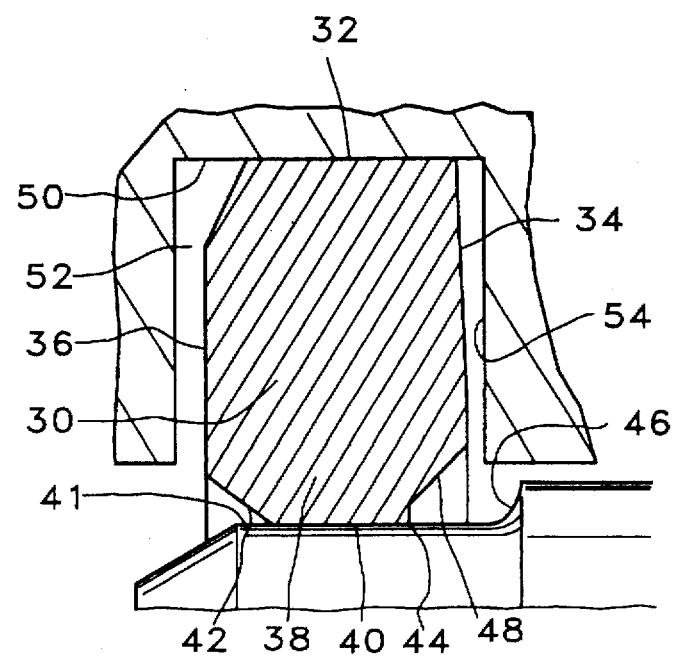

FIG. 4 is a fragmentary sectional view of a hydrodynamically lubricated, low pressure bit seal representing the prior art.

Figure 5:
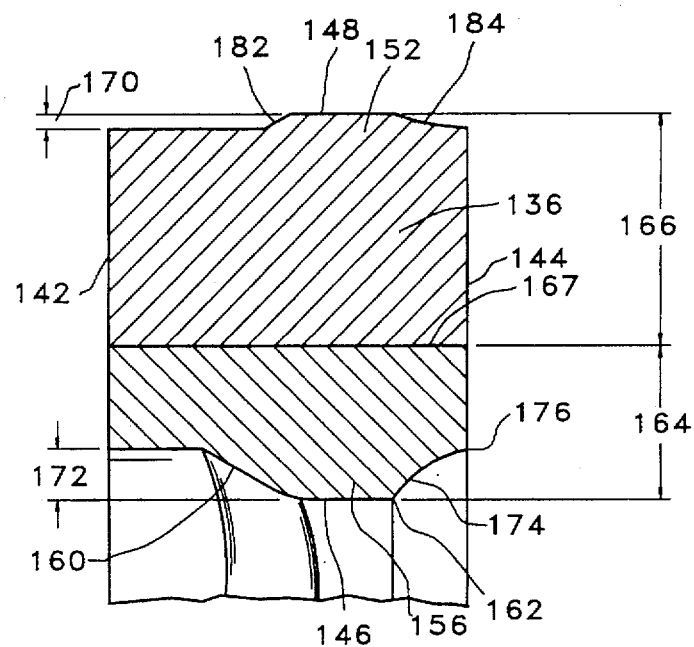
Figure 5A:
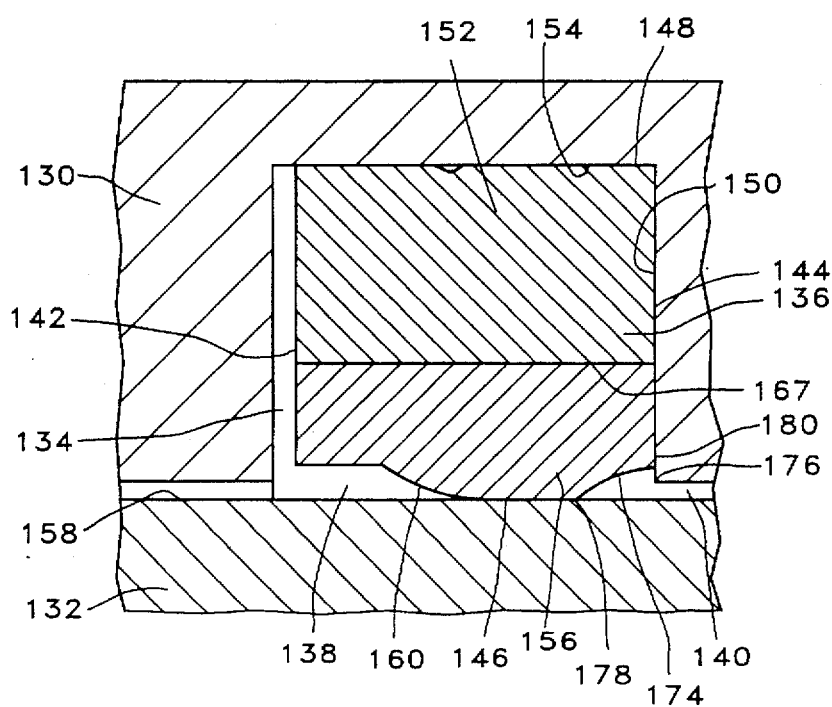

FIGS. 5 and 5A are fragmentary cross-sectional illustrations of a hydrodynamic rotary shaft seal representing the preferred embodiment of the present invention, with FIG. 5 showing the uncompressed condition of the seal, and FIG. 5A representing the compressed condition of the seal within the gland when exposed to lubricant pressure.

Figure 6:
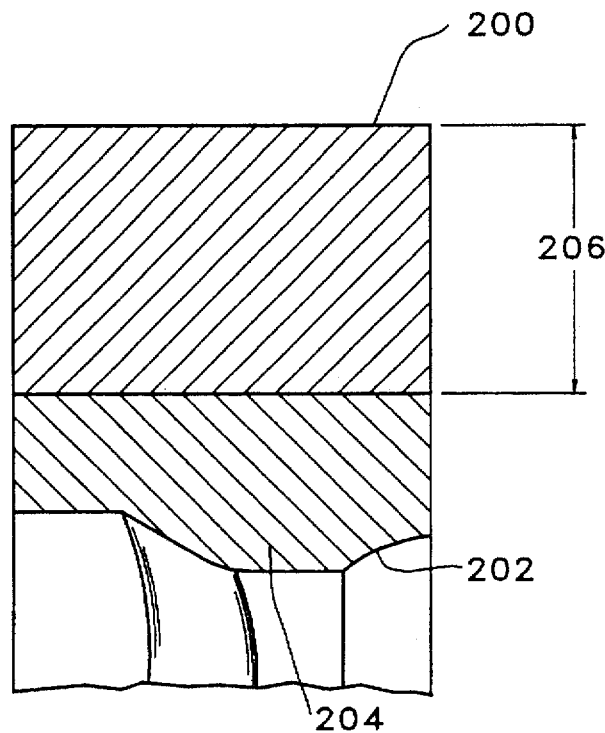

FIG. 6 is a fragmentary sectional view which illustrates a simplified alternate embodiment of the invention wherein the static sealing surface is provided by a cylindrical outer periphery rather than by a projecting lip.

Figure 7:
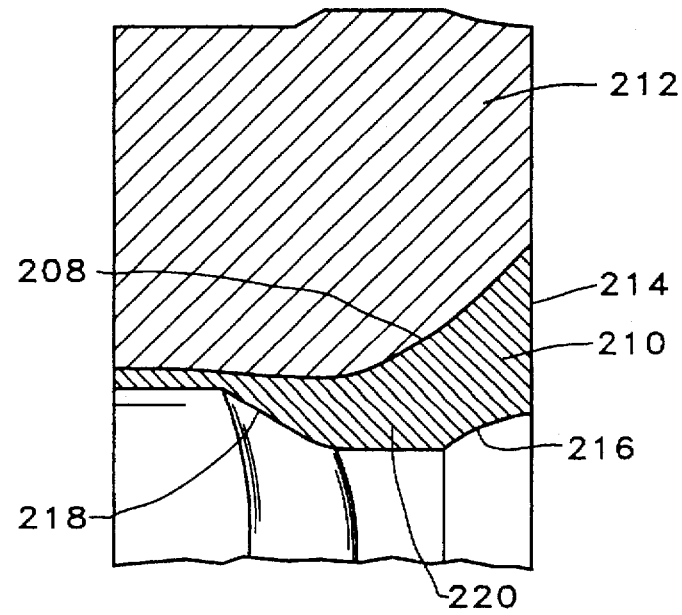

FIG. 7 is a fragmentary sectional view which illustrates an alternate embodiment of the invention wherein the interface between the high and low modulus materials is non-cylindrical.

Figure 8:
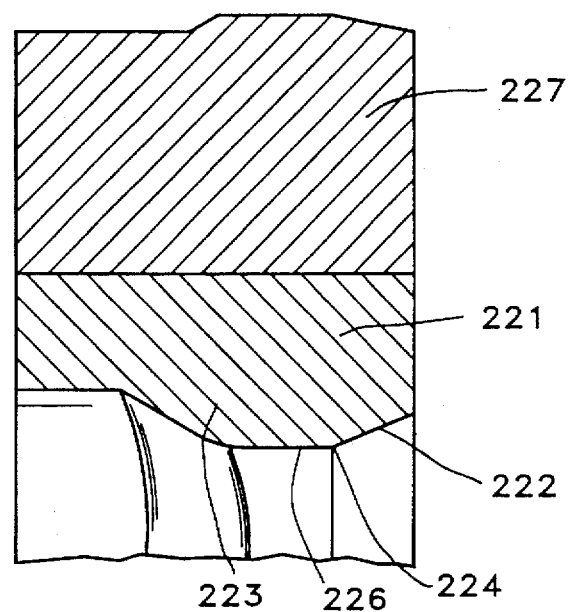

FIG. 8 is a fragmentary sectional view which illustrates an alternate embodiment of the multiple modulus seal of the present invention wherein the transitional non-planar flexible heel geometry takes conical form.

Figure 9:
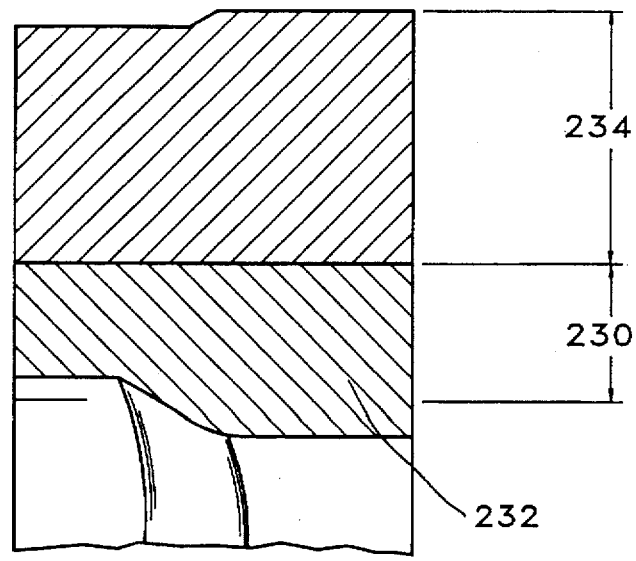

FIG. 9 is a fragmentary sectional view which illustrates a alternate embodiment wherein the multiple modulus composite construction is implemented without the flexible transitional non-planar exclusion edge heel geometry.

Figure 10:
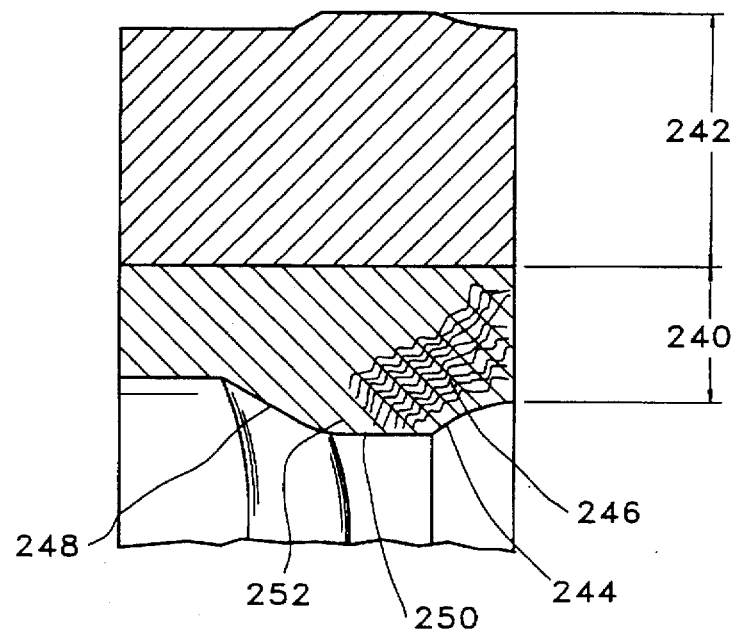
Figure 11:
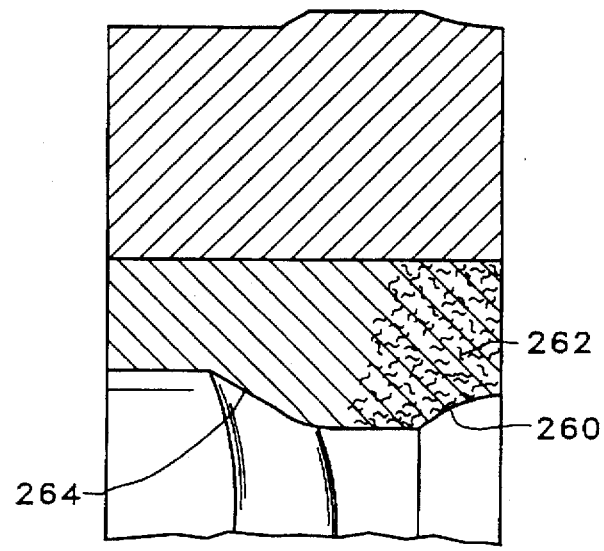
Figure 12:
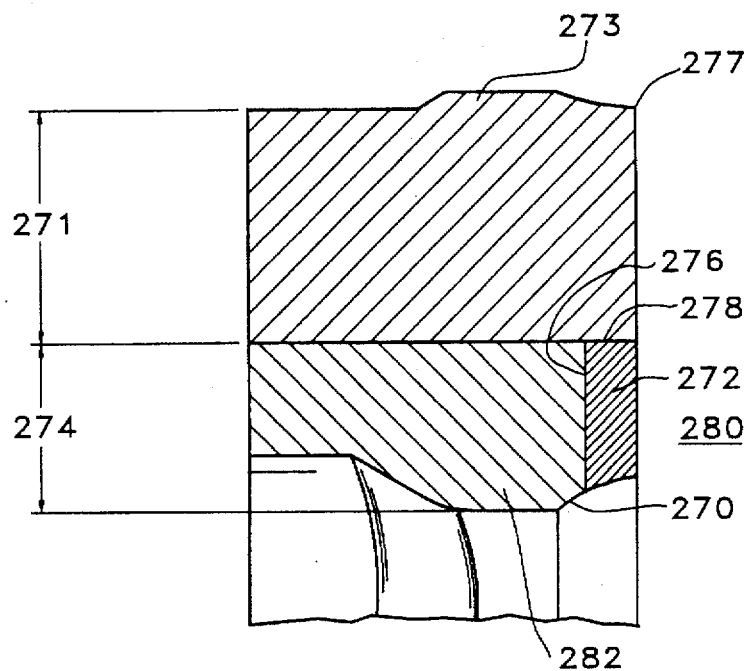

FIGS. 10, 11 and 12 are fragmentary sectional views which illustrate alternate embodiments wherein the high modulus portion of the seal is locally reinforced against extrusion by a yet higher modulus material.

Figure 13:
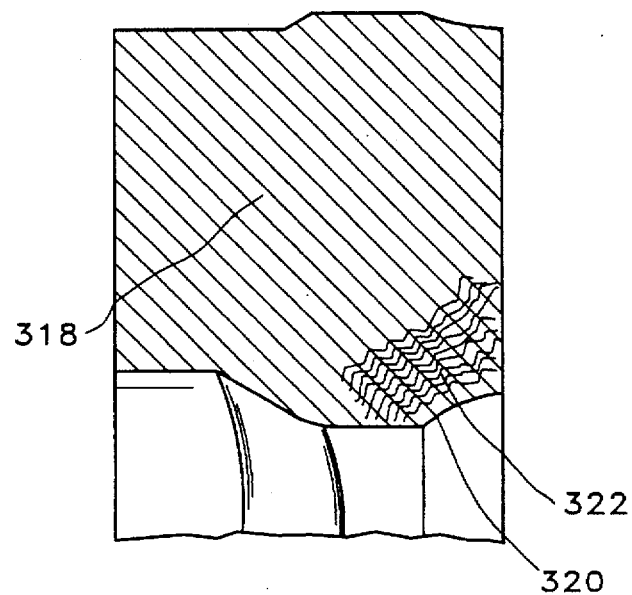

FIG. 13 is a fragmentary sectional view which illustrates an alternate embodiment wherein a seal having a body of single modulus construction incorporates a non-planar flexible heel geometry, and wherein said heel geometry may be locally reinforced against extrusion by a yet higher modulus material.

Figure 14:
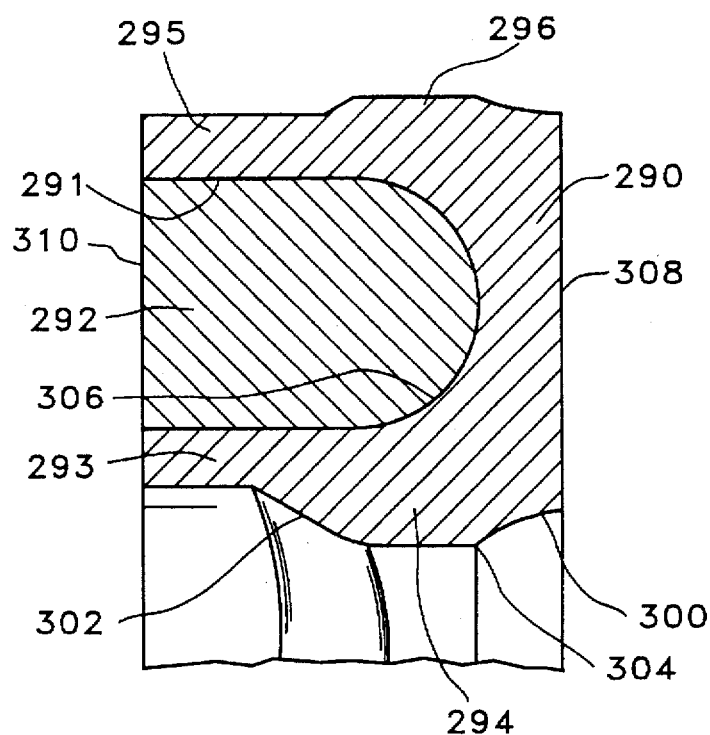

FIG. 14 is a fragmentary sectional view which portrays an alternate embodiment wherein the high modulus portion of the seal defines both the dynamic and static sealing lips and defines an annular cavity containing a sealing material of lower modulus which is oriented for exposure to the lubricant chamber.

Figure 15:
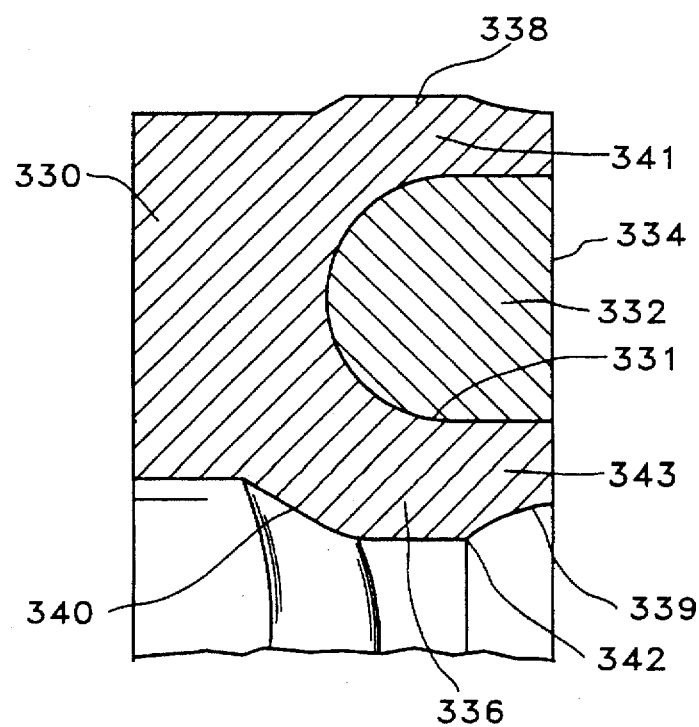
Figure 1:
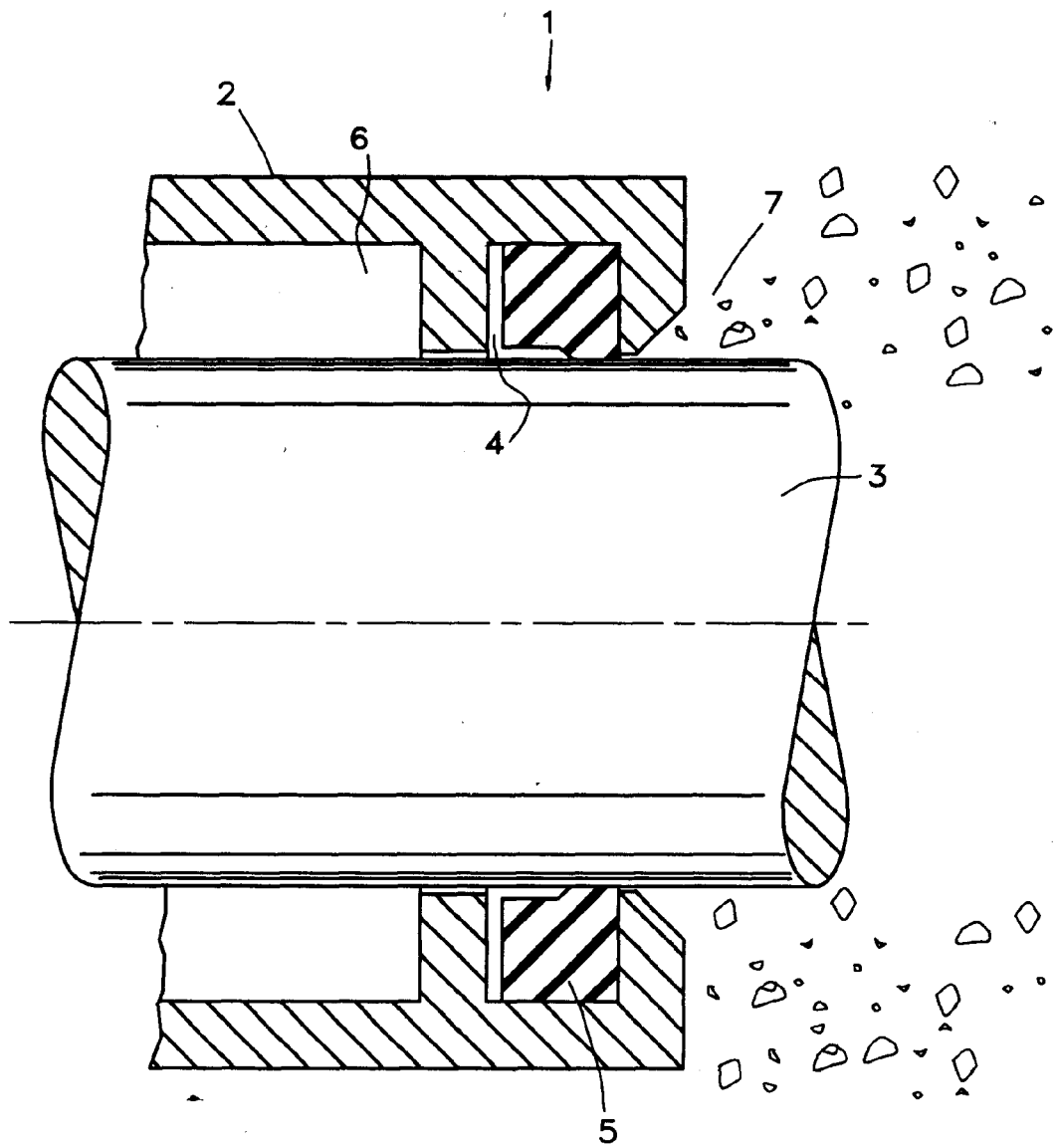
Figure 2:
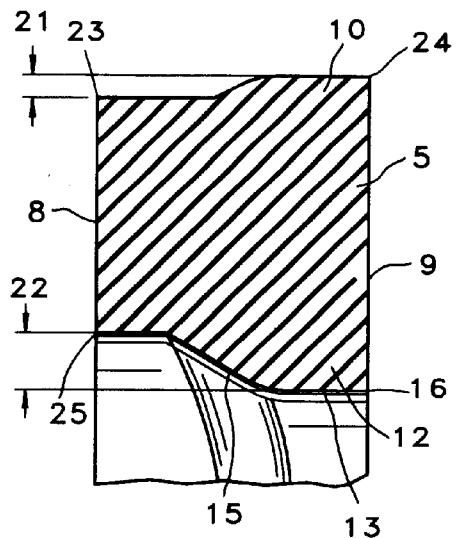
Figure 2A:
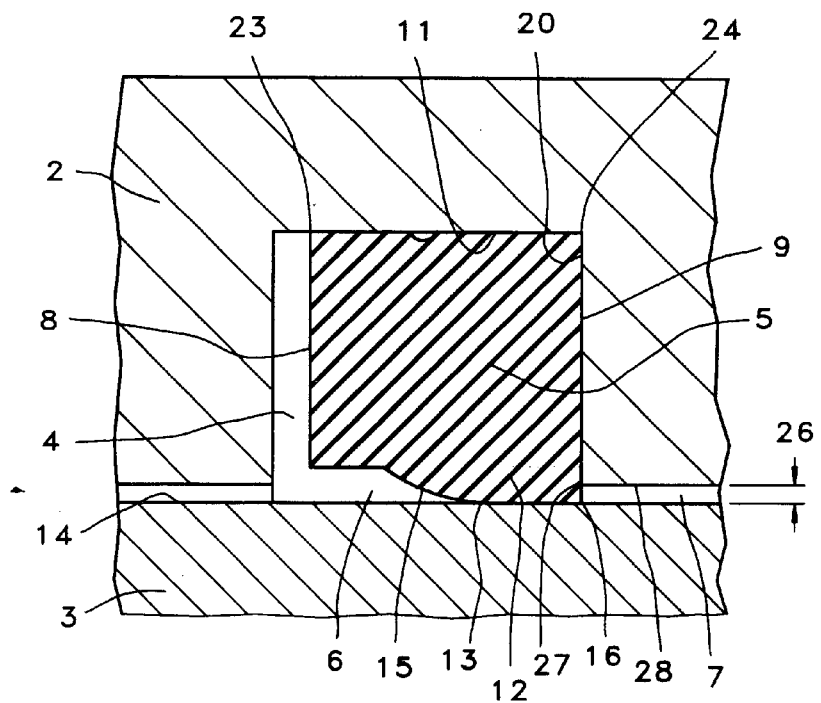
Figure 3:
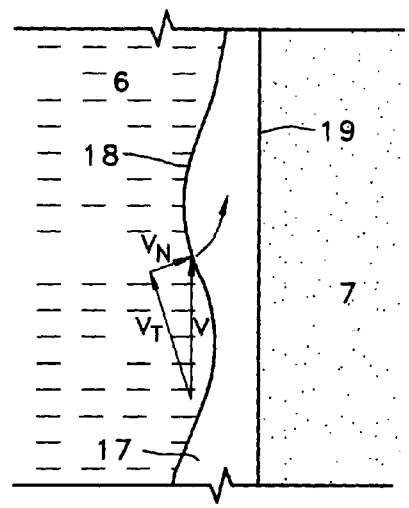
Figure 4:
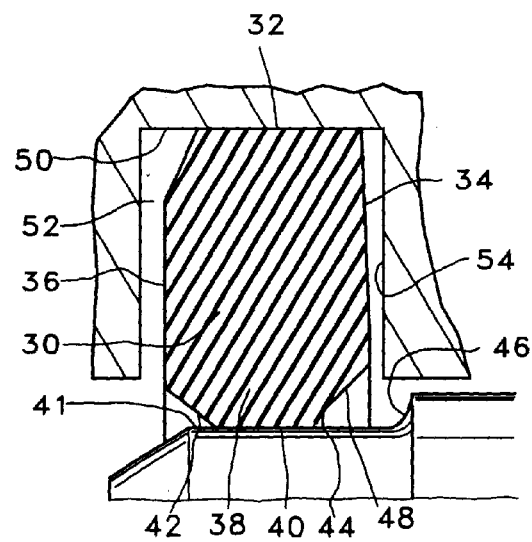
Figure 5:
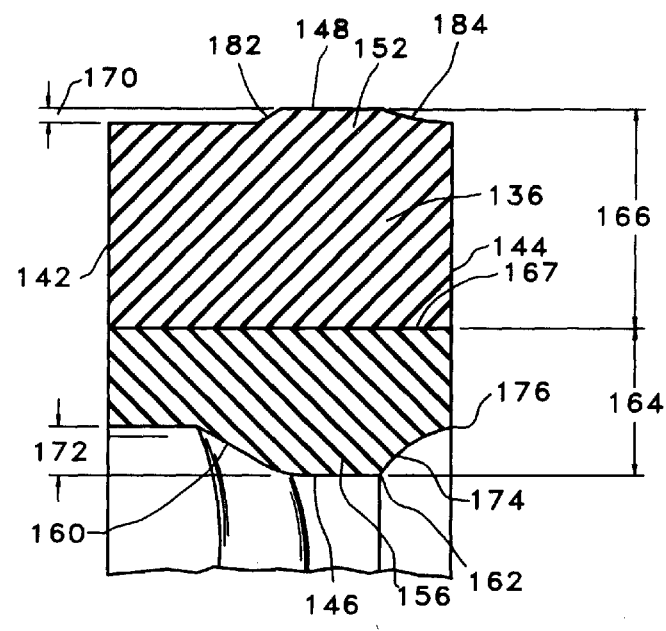
Figure 5A:
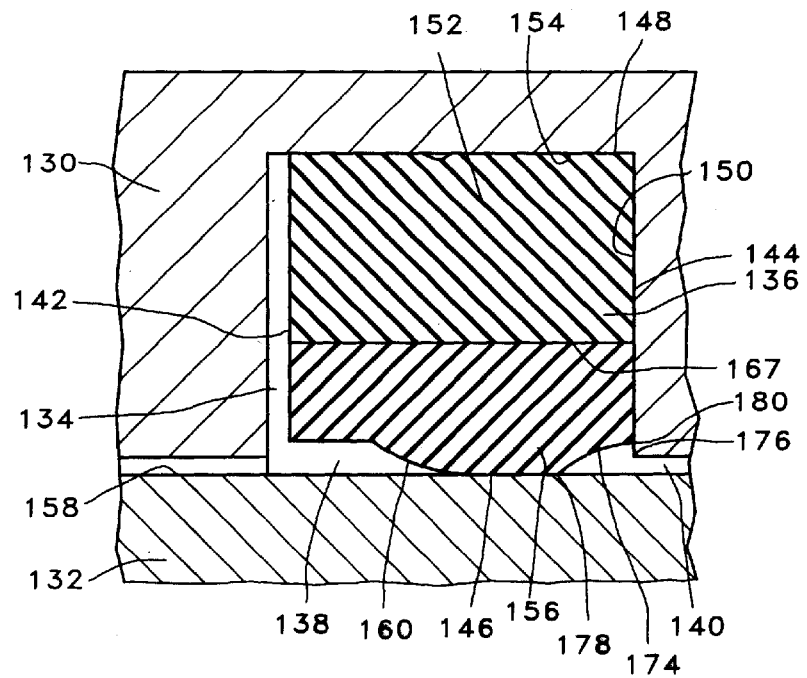
Figure 6:
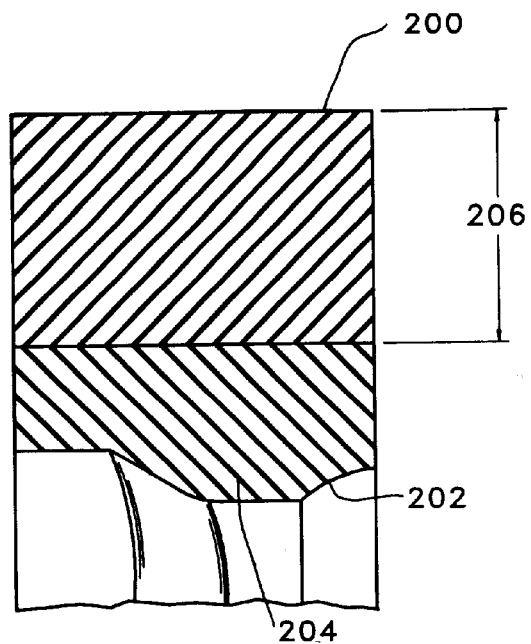
Figure 7:
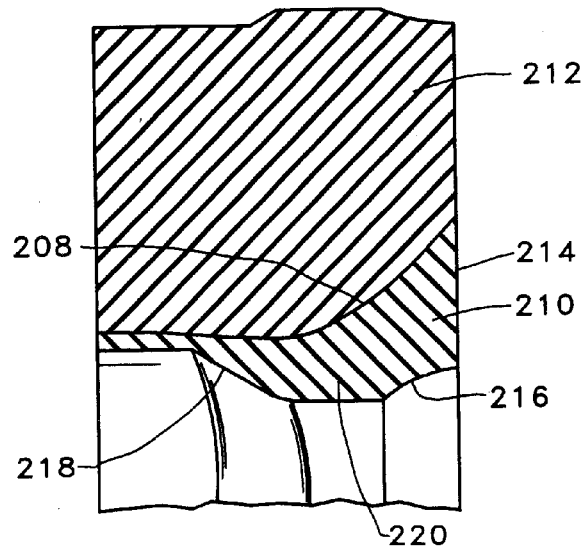
Figure 8:
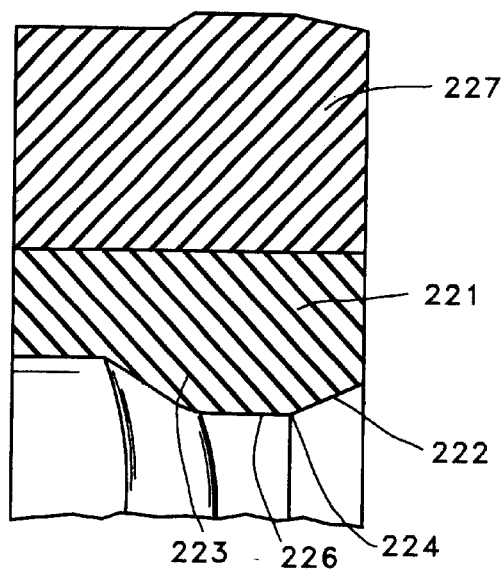
Figure 9:
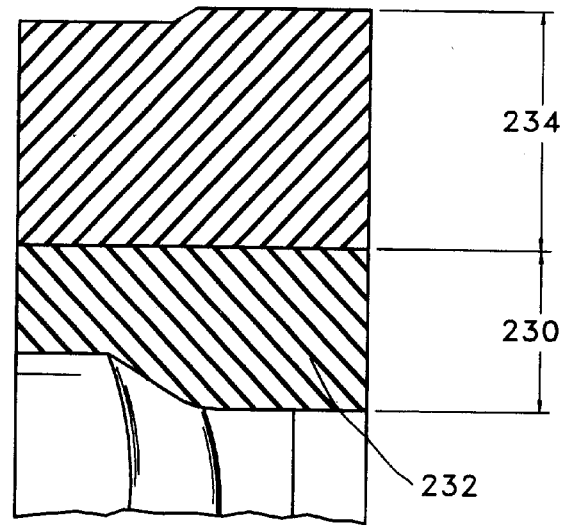
Figure 10:
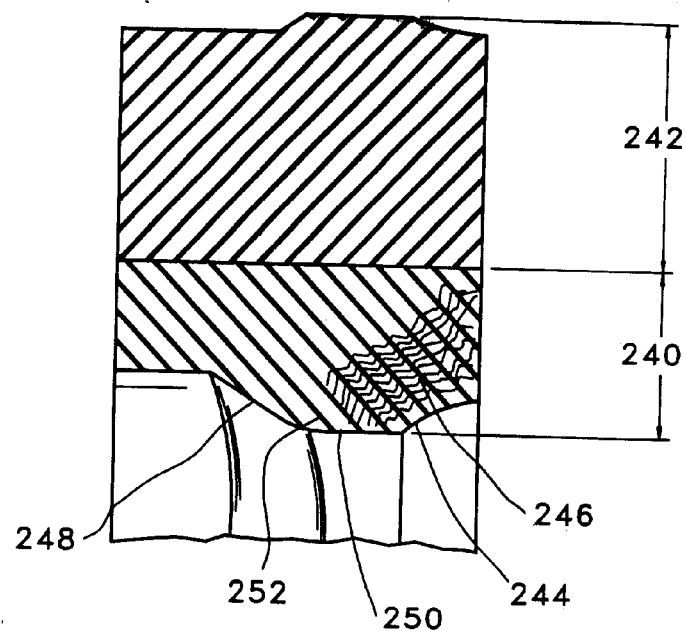
Figure 11:
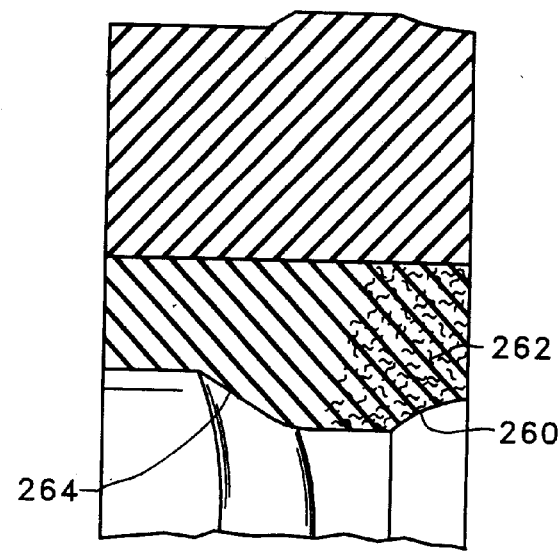
Figure 12:
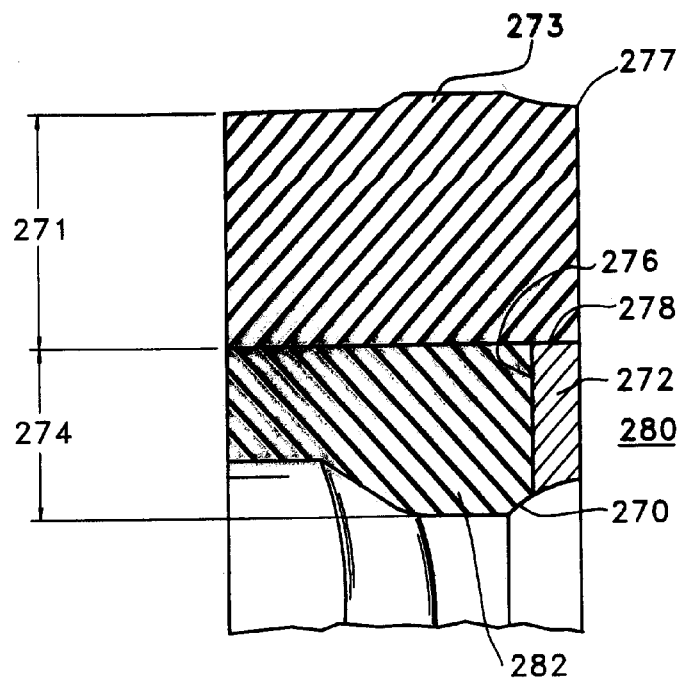
Figure 13:
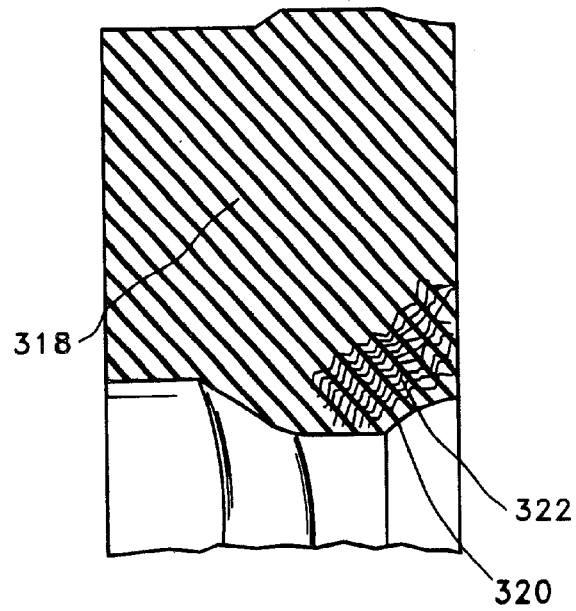
Figure 14:
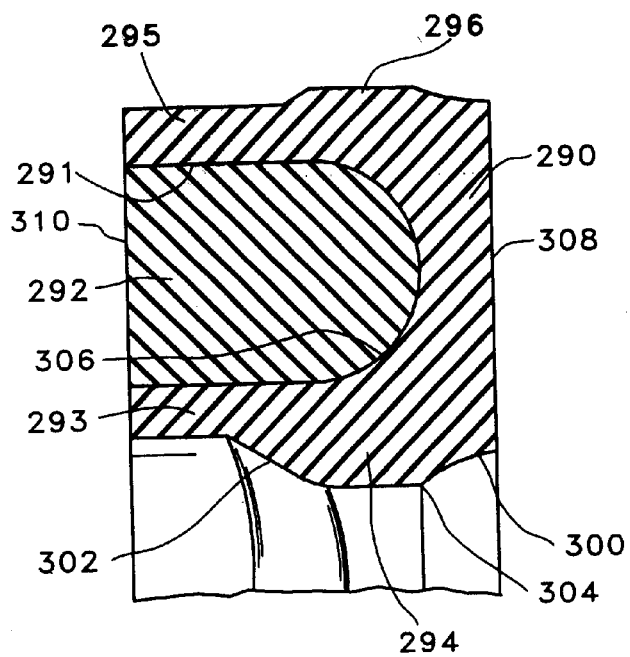
Figure 15:
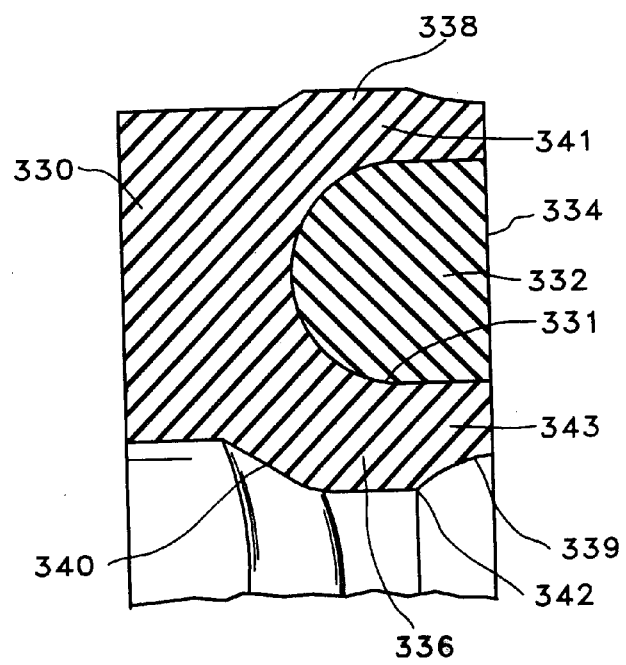

FIG. 15 is a partial sectional view illustrating another alternative embodiment of this invention wherein the hydrodynamically lubricated seal incorporates a seal body of high modulus resilient material which defines a circular face cavity containing resilient sealing material of lower modulus and wherein the lower modulus sealing material is oriented for exposure to the environment.

DETAILED DESCRIPTION OF PREFERRED EMBODIMENT

Referring now to the drawings, FIGS. 5 and 5A represent the preferred embodiment of the invention. FIG. 5 is a fragmentary cross-sectional view representing the uncompressed condition of the seal. FIG. 5A is a fragmentary view which represents the cross-sectional configuration of the seal of the present invention when located within its seal groove and radially compressed between the rotary shaft and the radially outer wall of the seal groove under conditions where the lubricant pressure is higher than the environment pressure.

In FIG. 5A there is shown a cross-sectional view of a sealed rotary shaft assembly including a housing 130 from which extends a rotary shaft 132. The housing defines an internal seal installation groove or gland 134 within which is located a ring shaped hydrodynamic rotary shaft sealing element 136 which is constructed in accordance with the principles of the present invention.

The hydrodynamic seal 136 is used to separate the lubricant 138 from the environment 140, and to prevent intermixing of the lubricant and the contaminant matter present within the environment. From an overall orientation standpoint, the end of the circular sealing element 136 which is oriented toward the lubricant is surface 142 and the end of the seal which is oriented toward the environment 140 is surface 144, the inner diameter of the seal is represented at 146, and the outer diameter is represented at 148. The compressed configuration of the seal shown in FIG. 5A is representative of its shape and position within the gland when the pressure of the lubricant 138 is higher than that of the environment 140, and the pressure of the lubricant forces the environmental end 144 of the seal against the environment-side gland wall 150. At the inner periphery of the circular sealing element 136 there is provided an inner circumferential protuberance or dynamic sealing lip 156 that defines a dynamic sealing surface 146 that is compressed against a counter-surface 158 of the rotatable shaft 132. When the seal 136 is installed in the circular seal groove or gland 134, a circular radially protruding static sealing lip 152 is compressed against a counter-surface 154 of the groove per the teachings of U.S. Pat. No. 5,230,520. The static lip approximates the average shape of the dynamic lip 156 by incorporation of non-planar lubricant side 182 and non-planar environmental side 184, but the projection 170 of the static lip does not necessarily equal projection 172 of the dynamic lip. The circular seal groove or gland 134 is sized to hold the resilient circular sealing element 136 in radial compression against the cylindrical sealing surface 158 of the shaft 132, thereby initiating a static seal with the housing and shaft in the same manner as any conventional interference type seal, such as an O-Ring. When shaft rotation is not present, a liquid tight seal is maintained at the static sealing interface between the static sealing lip 152 and the mating counter-surface 154 of the seal groove and between the dynamic sealing lip 156 and the counter-surface 158 of the shaft 132. When shaft rotation takes place, the hydrodynamic seal remains stationary with respect to the housing, and maintains a static sealing interface with said housing, while the seal-to-shaft interface becomes a dynamic sealing interface. The inner lip 156 incorporates a special geometry that promotes long seal life by hydrodynamically lubricating the dynamic seal-to-shaft interfacial zone, and by excluding environmental contaminates from the seal to shaft interface; this special geometry consists of a wavy, axially varying edge 160 on the lubricant side of the lip and a circular, abrupt non-axially varying edge 162 on the environmental side of the lip per the teachings of U.S. Pat. No. 4,610,319. From an overall orientation standpoint, FIGS. 5 and 5A are taken at a circumferential location which represents the average interfacial contact width of the dynamic sealing interface, which corresponds to the mid-point in the wave height of the hydrodynamic lubrication geometry described in U.S. Pat. No. 4,610,319.

As relative rotation of the shaft takes place, the wavy, axially varying edge 160 on the lubricant side of the lip, which has a gradually converging relationship with the shaft in the axial and circumferential directions, generates a hydrodynamic wedging action that introduces a lubricant film between the seal inner surface 146 and the counter-surface 158 of the shaft per the previously described teachings of U.S. Pat. No. 4,610,319. This lubricant film physically separates the seal and the shaft, and thereby prevents the typical dry rubbing type wear and blistering heat damage associated with conventional non-hydrodynamic interference type seals, and thereby prolongs seal and mating shaft surface life and makes higher service pressures and higher speeds practical. The geometry of the hydrodynamic inlet geometry can take any one of many suitable forms that result in a gradually converging, axially varying shape at the lubricant side of the dynamic sealing lip without departing from the spirit or scope of the present invention. The abrupt circular corner 162 of the environmental side of the dynamic sealing lip is not axially varying, and does not generate a hydrodynamic wedging action with the environment in response to relative rotary motion, and thereby functions to exclude particulate contaminants from the seal-to-shaft interface per the previously described teachings of U.S. Pat. No. 4,610,319. The improved extrusion resistance of the present invention is accomplished by a the cooperative benefits of a composite multiple modulus construction and a non-planar flexible environmental end transitional heel geometry. So that the portion of the dynamic sealing lip closest to the shaft to housing extrusion gap exhibits high extrusion resistance, a second limited portion 164 of the seal which includes the dynamic sealing lip 156 and non-planar flexible heel geometry 174, is constructed from a hard, relatively high modulus extrusion resistant material such as a flexible polymeric material, a high modulus elastomer such as one having 90 or 95 Durometer Shore A hardness, or a fabric, fiber and/or metal reinforced elastomer or a high performance temperature resistant plastic such as Teflon or Peek which is filled with glass, carbon or graphite fillers. A first larger portion 166 of the seal which is integrally bonded to said the limited portion is made from a relatively soft, resilient material such as a low durometer elastomer having 40–80 Durometer Shore A hardness. The interface 167 between 164 and 166 may take cylindrical form, as shown, or other suitable form. The interface 167 between 164 and 166 is bonded (such as during molding of the seal) to form a one piece integrally constructed sealing element of composite construction. The composite multiple modulus construction provides the extrusion resistance benefit of higher modulus materials without the usual accompanying penalty of high interfacial contact pressure. The contact pressure at the dynamic sealing interface resulting from radial compression is governed by the relatively low modulus of the relatively soft, resilient material 166 rather than by the relatively high modulus of the relatively hard, extrusion resistant material 164 used to construct the dynamic sealing lip thereby reducing breakout and running torque and self generated heat.

Since the dynamic sealing lip material 164 has a significantly higher modulus than the softer body material 166, the softer body material is compressed to a significantly higher percentage of compression than the harder material of the dynamic sealing lip upon installation, therefore radial compression has very little effect upon the shape of the dynamic sealing lip so that the angulated, axially varying hydrodynamic inlet geometry 160 and the non-planar flexible heel geometry 174 are not overly flattened against the relatively rotating counter-surface. Therefore the intended hydrodynamic wedging of lubricant into the dynamic sealing interface is not impeded by any undesirable gross distortion of the hydrodynamic geometry, nor is the function of flexible geometry 174 impeded by gross distortion. This is an improvement over the prior art, where the dynamic lip could in some cases become flattened and distorted when subject to radial compression because it compressed at the same rate as the static sealing lip. In the present invention, the optimum projection 170 of the static sealing lip is approximately equal in dimension to the amount of compression the softer body material 166 undergoes upon installation. The projection 172 of the dynamic sealing lip can be much less than that of the prior art owing to the high modulus construction of the dynamic lip of the present invention, which limits the amount of compression induced distortion of the dynamic lip, and also enhances the extrusion resistance of the dynamic lip. It can also be appreciated that the minimal distortion of the dynamic sealing lip material 164, as compared to the prior art, makes the present invention much more tolerant of high levels of installation squeeze. In the prior art seal the distortion of the dynamic lip due to radial compression also results in axial spreading of the seal footprint against the shaft, which increases the seal torque; in the present invention the axial width of the seal footprint is relatively constant over a wide range of seal compression, and seal torque is therefore less sensitive to radial compression variations.

The aforementioned non-planar flexible transitional heel geometry 174 extends from abrupt circular exclusionary corner 162 to corner 176 which is defined at the intersection with environmental end surface 144. Because of the circular, non-axially varying environmental edge configuration of abrupt edge 162, the seal does not generate a hydrodynamic wedging action with the environment in response to relative rotary motion, and thereby functions to exclude particulate contaminants from the seal-to-shaft interface per the teachings of U.S. Pat. No. 4,610,319. Compared to prior art, the exclusionary function of abrupt edge 162 is enhanced by the non-planar flexible transitional heel geometry 174 because the hydraulic force resulting from lubricant pressure acting over the unsupported seal area between the last point of contact with the shaft 178 and the last point of contact 180 with the environmental wall amplifies the interfacial contact pressure at the environmental edge of the seal footprint. The exclusionary function of abrupt edge 162 is further enhanced by the non-planar flexible transitional heel geometry 174 because the overhanging seal body material located to the right of abrupt edge 162 (radially outward from heel geometry 174) experiences radial compression which is reacted by the dynamic lip, thereby increasing interfacial contact pressure at the environmental edge of the seal footprint, compared to the prior art.

The non-planar flexible heel geometry 174 provides the seal with significant pressure retention advantages over the prior art, as described hereafter. The modulus of the material used in construction of prior art high pressure seals was limited to relatively low values which upon radial compression did not cause excessive interfacial contact pressure, therefore the environmental end of the seal was necessarily given a planar shape so that the relatively soft seal material was supported by the planar shape of the gland wall against lubricant pressure. This meant that high lubricant pressure could make the material adjacent to the extrusion gap bulge into the extrusion gap and receive fatigue damage. With the present invention, wherein the dynamic lip 156 is constructed of a hard, stiff, high modulus flexible material, the axial force imposed by lubricant pressure causes transitional non-planar flexible heel geometry 174 to flex toward the shaft to housing extrusion gap, but does not force it to extrude or bulge into the extrusion gap. The environmental side of the seal is therefore protected from fatigue resulting from contact with the potentially sharp, rough corner 176, and is protected from fatigue damage which can result from being repeatedly forced to into the extrusion gap past sharp corner 176. With the prior art seal, any material forced to extrude or bulge into the extrusion gap is subjected to a high level of stress as the extrusion gap size changes due to pressure breathing of the housing and dynamic lateral shaft motion, because the extrusion gap size change is very large compared to the size of the extruded material. For example, the local extrusion gap can vary dynamically due to shaft runout. The worst extrusion of seal material is caused when the local extrusion gap is temporarily at its largest, then the local extrusion gap may quickly close to near zero clearance as the high point of shaft runout passes by. The high level of resulting stress causes fatigue of the extruded material, causing it to break off from the seal, as described earlier. When the present invention is exposed to high lubricant pressure, as shown in FIG. 5A, the non-planar flexible heel geometry drapes between the last point of contact 178 with the shaft 132 and the last point of contact 180 with the environmental side gland wall 150. As the extrusion gap size changes, the non-planar flexible heel geometry absorbs the lateral movement over the distance between 178 and 180, which is a relatively long distance (compared to the prior art extrusion gap size) so the average strain is kept below the fatigue limit of the seal material. This feature provides the seal with the ability to withstand higher pressure, larger shaft to housing clearance, and larger lateral motion compared to the prior art.

This invention has application where rotary shafts are sealed with respect to a housing with either the housing or the shaft being the rotary member. The projecting dynamic and static sealing lips can be on the inside and outside of the seal cross-sectional shape when the seal is compressed in the radial direction, with the dynamic lip being located on either the inner or the outer periphery. Alternately, the projecting dynamic and static sealing lips can be on opposite ends of the seal cross-sectional shape when the seal is compressed in an axial direction against relatively rotating planar countersurfaces.

The flexible heel geometry and multiple-modulus construction of the present invention, and the associated benefits relating to torque and heat reduction, improved pressure retention capability, improved exclusionary function, etc. also have application in interference type seals which incorporate an axially varying hydrodynamic geometry on the lubricant side of the dynamic sealing interface, and which incorporate a non-circular, axially varying geometry on the environmental edge of the seal footprint.

DESCRIPTION OF ALTERNATIVE EMBODIMENTS

FIG. 6 illustrates a simplified alternate embodiment of the invention wherein the static sealing surface is provided by a non-projecting periphery 200 rather than by the projecting static lip of the preferred embodiment. While this configuration does subject the dynamic inner lip to more compression-induced distortion and therefore requires more lip projection than the preferred embodiment, it is still afforded significantly increased extrusion resistance and relatively low interfacial contact pressure by virtue of the cooperative benefits of the non-planar flexible heel geometry 202 and composite construction wherein the dynamic sealing lip 204 and flexible geometry 202 are made from a relatively high modulus material such as plastic or high-durometer elastomer and a softer body section 206 is made from a lower modulus material such as a low durometer elastomer.

FIG. 7 illustrates an alternate embodiment wherein the interface 208 between the higher modulus material 210 and the lower modulus material 212 is of a non-cylindrical, tapering configuration so that the higher modulus material is radially thickest toward the environmental end 214 of the seal where strength is needed to limit and minimize lubricant pressure induced deformation of the non-planar flexible heel geometry 216, and thinner toward the hydrodynamic geometry 218 of the dynamic lip 220 to enhance the flexibility of the hydrodynamic inlet geometry and thereby minimize interfacial contact pressure at the hydrodynamic inlet geometry and thereby promote optimum hydrodynamic lubrication of the dynamic interface. As shown in FIG. 7, the general cross-sectional shape of the higher modulus material provides heel flexibility in the radial direction while imparting stiffness in the axial direction.

FIG. 8 illustrates an alternate embodiment wherein the non-planar flexible heel geometry 222 takes a simple conical form, i.e. a chamfer, which defines abrupt, circular exclusionary corner 224 at the intersection with the cylindrical inner periphery 226 of the seal. As with the preferred embodiment, the dynamic lip 223 and flexing geometry 222 are constructed of a high modulus flexible material, and another portion 227 is made from a softer material. A partial, but none-the-less significant, improvement in extrusion resistance can be had over the prior art hydrodynamic seal by employing a seal having alternate embodiment as shown in FIG. 9, wherein the composite construction of a high modulus section 230 including dynamic lip 232 and a lower modulus body section 234 can be employed without the non-planar flexible heel geometry of the preferred embodiment. Thus, the extrusion resistance the seal is controlled by the higher modulus material 230, and the interfacial contact pressure is controlled by the lower modulus material 234. Experiments conducted by the inventor and his associates have confirmed that the composite multiple modulus construction alone (without the non-planar flexible heel geometry) provides a useful increase in extrusion resistance over the prior art, although considerably less than when the multiple modulus construction is combined with the non-planar flexible heel geometry. The embodiment of FIG. 9 is, however, optimum for applications where the reduction in interfacial contact pressure afforded by the multiple modulus construction is much more important than high pressure capability. For example, centrifugal pumps operate at low pressures where seal extrusion is not a problem, but a low seal interfacial contact pressure is required because the sleeved, solid shaft of the pump is inefficient at conducting self generated heat away from the seals.

Although already mentioned in disclosure of the preferred embodiment, we now reiterate that the high modulus seal portion incorporating the dynamic lip can be reinforced by yet-higher modulus material by employing a fiber or fabric reinforced elastomer composite or a fiber or metal-particle reinforced plastic composite. In alternate embodiment, as shown in FIGS. 10, 11 and 12, such reinforcement can be limited to or concentrated in or near the region of the non-planar flexible heel geometry.

FIG. 10 illustrates such an alternate embodiment wherein a portion 240 of the seal is made from high modulus material, and a portion 242 is made from low modulus material. The non-planar flexible heel geometry 244 is constructed from a high modulus material and locally reinforced by layered fabric 246 having higher strength than the base high modulus material, and being integrally molded to the base high modulus material. This construction provides added extrusion resistance in the region of the non-planar flexible heel geometry where strength and stiffness is needed to limit and minimize lubricant pressure induced deformation of the non-planar flexible heel geometry 244, while leaving the hydrodynamic inlet geometry 248 relatively flexible and thereby minimizing interfacial contact pressure at the hydrodynamic inlet geometry and thereby promoting optimum hydrodynamic lubrication of the dynamic inner periphery 250 of the dynamic lip 252. As shown in FIG. 10, the lay of the fabric 246 can be oriented to provide heel flexibility in the radial direction while imparting stiffness in the axial direction.

FIG. 11 illustrates an alternate embodiment wherein the non-planar flexible heel geometry 260 is locally reinforced and stiffened by randomly oriented fibers 262 constructed of a high strength reinforcement material such as Kevlar. The reinforcement fibers 262 are concentrated near the non-planar flexible heel geometry 260, thereby leaving the hydrodynamic inlet geometry 264 more flexible.

Referring again to FIG. 5, lubricant pressure acting over the unsupported area between the last point of contact 178 with the shaft 132 and the last point of contact 180 with the environment-side gland wall 150 causes deformation of the non-planar flexible heel geometry 174, causing it to bulge toward the extrusion gap by causing the last point of contact with the shaft to move towards the environmental side gland wall, and by causing the last point of contact with the environmental side gland wall to move toward the shaft. The ultimate pressure capability ability of the seal depicted by FIGS. 5 and 5A is limited by such pressure induced deformation of the non-planar flexible heel geometry; at some elevated level of pressure well beyond the capacity of the prior art, extrusion will occur. The previously described alternate embodiments of FIGS. 10 and 11 minimize pressure induced deformation of the non-planar flexible heel geometry by employing fiber, fabric, or metal particles to reinforce a local portion of the seal near the non-planar flexible heel geometry.

FIG. 12 shows an alternate composite multiple modulus construction means of reinforcing the non-planar flexible heel geometry. The seal has a low modulus portion 271 which incorporates a static sealing lip 273, and has a high modulus portion 274 which incorporates a dynamic sealing lip 282 and a non-planar flexible heel geometry 270. A ring 272 of very high modulus material (such as high strength plastic or metal) is incorporated as an integral part of the high modulus portion 274 of the seal by virtue of being bonded during the molding process to the remaining material of the seal at interfaces 276 and 278. By virtue of its very high modulus and its bonded relationship with the remaining material of the seal, the end of the non-planar flexible heel geometry oriented toward the environment 280 is reinforced against pressure-induced movement toward the shaft (not-shown), and the ultimate pressure retaining capacity of the seal is thereby significantly enhanced. Ring 272 may also extend to corner 277.

FIG. 13 illustrates a simplified alternate embodiment of the invention wherein the basic seal body 318 is of a single modulus construction rather than the multiple modulus construction of the preferred embodiment. While this configuration does subject the dynamic inner lip to more compression-induced distortion and higher interfacial contact pressure compared to the preferred embodiment, it does provide significantly increased extrusion resistance by virtue of the non-planar flexible heel geometry 320. As described previously in relation to FIGS. 10, 11, and 12, the non-planar flexible heel geometry 320 of FIG. 13 may also be optionally reinforced and stiffened locally against extrusion by a reinforcing material 322 which has a higher modulus than the basic seal body 318, and which is concentrated in or near the region of the non-planar flexible heel geometry. The reinforcing material 322 may be of any suitable type, such as the fiber or fabric reinforcement material shown in FIG. 13 and described previously in conjunction with FIG. 10, or such as the randomly oriented fibers constructed of a high strength reinforcement material such as Kevlar described previously in conjunction with FIG. 11, or such as the as high strength plastic or metal ring described previously in conjunction with FIG. 12.

FIG. 14 represents an alternate embodiment of the invention where the high modulus material section 290 takes C-shaped form when viewed in cross-section, and partially surrounds the low modulus material section 292. The C-shaped higher modulus section may be oriented such that the low modulus section is exposed at the lubricant end 310 of the seal. The C-shaped outer shell formed by the outer harder durometer material 290 thus defines a circular body cavity 291 which is open to the lubricant end of the seal and permits the convenient use of castable materials during manufacture of the soft inner core 292. A further advantage of the embodiment illustrated in FIG. 14 is that the C-shaped outer shell formed by the outer harder durometer material 290 surrounds the softer material 292 and separates the softer material from the environment, thereby protecting it from environment related deterioration. The "C"-shaped configuration of the harder durometer material defines radially spaced inner and outer body rims 293 and 295 that, because of their relatively thin configuration, are more flexible than the seal body structure at the opposite axial end of the seal. Thus, when the seal is exposed to lubricant pressure the body rims can be urged radially outwardly to some extent by pressure induced force acting through the softer resilient material, thus enhancing the sealing capability of the dynamic and static sealing lips.

FIG. 15 represents an alternate embodiment where the high modulus material section 330 takes C-shaped cross-sectional form, and partially surrounds the low modulus material section 332. The C-shaped higher modulus section is oriented such that the low modulus section is exposed at the environment end 334 of the seal. As compared to the embodiment of FIG. 14, the embodiment of FIG. 15 is configured to provide lower interfacial contact pressure and lower breakout and running torque. The C-shaped outer shell formed by the outer harder durometer material 330 defines a circular body cavity 331 which permits the convenient use of castable materials during manufacture of the soft inner core 332. The high modulus material section 330 incorporates a dynamic sealing lip 336 and can (as shown) optionally incorporate a static sealing lip 338. The high modulus material section 330 can also (as shown) optionally incorporate a nonplanar flexible heel geometry 339 adjacent to the dynamic sealing lip 336. When the seal is installed within a seal gland of the housing the somewhat conically configured circular heel geometry will be located both axially and radially remote from the circular space between the housing and the relatively rotatable surface. As pressure responsive deformation of the seal occurs in high pressure service the heel geometry minimizes the possibility that a circular portion of the seal can be extruded into the circular gap between the housing and the relatively rotatable surface. As with the previous embodiments, the dynamic sealing lip incorporates a hydrodynamic pumping geometry 340 on the lubricant side, and an abrupt circular exclusionary geometry 342 on the environment side. The C-shaped body section of the seal provides radially spaced body rims 341 and 343 that, because of their relatively thin configuration are somewhat flexible and are thus moveable radially for enhancing the sealing capability of the dynamic and static sealing lips of the seal.

The high modulus material section 290 incorporates a dynamic sealing lip 294 and can (as shown in FIG. 14) optionally incorporate a static sealing lip 296. The high modulus material section 290 can also (as shown in FIG. 14) optionally incorporate a non-planar flexible heel geometry 300 adjacent to the dynamic sealing lip 294. As with the previous embodiments, the dynamic sealing lip incorporates a hydrodynamic pumping geometry 302 on the lubricant side, and an abrupt circular exclusionary geometry 304 on the environmental side. As with the embodiment of FIG. 7, the interface 306 between the low modulus material and the high modulus material can conveniently be made non-cylindrical, so that the higher modulus material is radially thickest toward the environmental end 308 of the seal where strength is needed to limit and minimize lubricant pressure induced deformation of the non-planar flexible heel geometry 300, and thinner toward the lubricant end 310 of the seal to enhance the flexibility of the hydrodynamic inlet geometry.

As will be readily apparent to those skilled in the art, the present invention may be produced in other specific forms without departing from its spirit or essential characteristics. The present embodiments are therefore to be considered as illustrative and not restrictive.

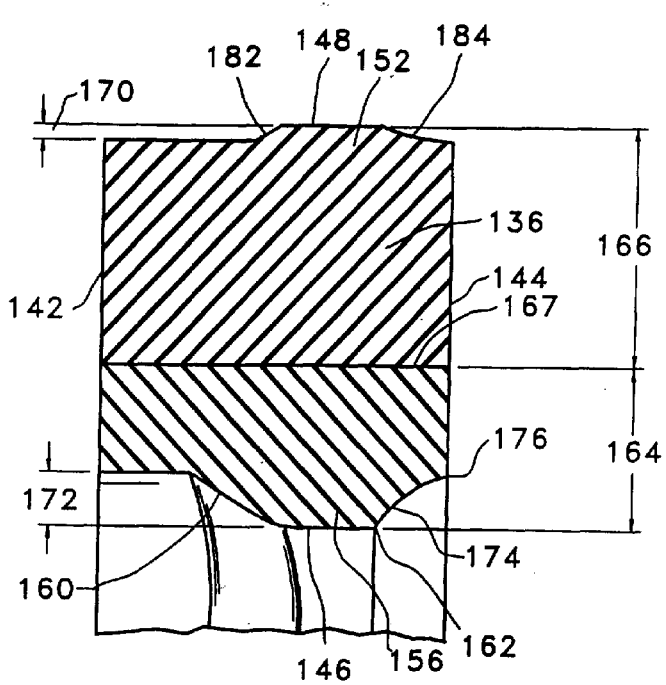

What is claimed is:

1. A circular interference type extrusion resistant hydrodynamic seal for location within a housing defining a lubricant chamber and for dynamic sealing engagement with a relatively rotatable surface and for serving as a partition between the lubricant chamber and a contaminated environment, and for controlling seal deformation and interfacial contact force between the seal and the relatively rotatable surface and thus regulate lubricant film thickness between the seal and the relatively rotatable surface, and having a lubricant end and an environmental end, comprising:

(a) a first circular ring-like seal section being composed of resilient material and having a predetermined modulus of elasticity;

(b) a second circular ring-like seal section being composed of flexible material having a modulus of elasticity greater than said predetermined modulus of elasticity of said first circular ring-like seal section, said second circular ring-like seal section being connected integral with said first circular ring-like seal section and resisting lubricant pressure induced extrusion of said second circular ring-like seal section between said housing and said relatively rotatable surface; and (c) a circular dynamic sealing lip being defined by said second circular ring-like seal section and projecting radially therefrom, said circular dynamic sealing lip having a peripheral sealing surface for sealing engagement with said relatively rotatable surface, said dynamic sealing lip further defining a hydrodynamic geometry at one axial extremity thereof having an axially varying hydrodynamic edge for facing said lubricant chamber and for hydrodynamically wedging a film of lubricant between said dynamic sealing lip and said relatively rotatable surface;

(d) an abrupt axially nonvarying exclusionary geometry being defined at the opposite axial extremity of said dynamic sealing lip: and (e) means, comprising said greater modulus of elasticity of said second circular ring-like seal section than said predetermined modulus of elasticity of said first circular ring-like seal section for minimizing contact force of said dynamic sealing lip of said second circular ring-like seal section with said relatively rotatable surface and minimizing compression induced distortion of said hydrodynamic geometry of said circular dynamic sealing lip for controlling hydrodynamic wedging of said film of lubricant and controlling the thickness of the film of lubricant between said peripheral sealing surface of said dynamic sealing lip and said relatively rotatable surface.

2. The circular interference type extrusion resistant hydrodynamic seal of claim 1, wherein:

(a) said peripheral sealing surface being of cylindrical configuration;

(b) said first and second circular ring-like seal sections defining a radially oriented end surface being oriented in substantially normal relation with said peripheral sealing surface; and (c) said abrupt non-hydrodynamic exclusionary geometry being a circular substantially angularly oriented end surface intersecting said radially oriented end surface and said peripheral sealing surface.

3. The circular interference type extrusion resistant hydrodynamic seal of claim 1, further comprising:

a circular static sealing lip projecting radially from said first circular ring-like seal section and being disposed in substantially radially opposed relationship with said dynamic sealing lip.

4. The circular interference type extrusion resistant hydrodynamic seal of claim 1, wherein:

said second circular ring-like seal section being located at least partially within said first circular ring-like seal section.

5. The circular interference type extrusion resistant hydrodynamic seal of claim 1, wherein the housing and the relatively rotatable surface define a circular clearance therebetween and wherein:

(a) said first and second circular ring-like seal sections defining a circular end surface being oriented in substantially normal relation with said peripheral sealing surface and defining at least a portion of said environment end; and (b) said abrupt axially nonvarying exclusionary geometry defining a non-planar flexible transitional heel geometry having a circular recess surface and having circular intersection with said circular end surface radially remote from said peripheral sealing surface and having circular intersection with said peripheral sealing surface axially remote from said circular end surface.

6. The circular interference type extrusion resistant hydrodynamic seal of claim 5, wherein:

said circular recess surface being of conical cross-sectional configuration.

7. The circular interference type extrusion resistant hydrodynamic seal of claim 5, wherein:

said first and second ring-like seal sections defining a circular, non-cylindrical interface providing said second ring-like seal section with a greater radial thickness at said environment end thereof as compared with the radial thickness thereof at said axially varying lubricant end thereof.

8. The circular interference type extrusion resistant hydrodynamic seal of claim 5, further comprising:

means reinforcing said second circular ring-like seal section adjacent said non-planar flexible transitional heel geometry to minimize high pressure displacement thereof into said circular clearance.

9. The circular interference type extrusion resistant hydrodynamic seal of claim 8, wherein said means reinforcing comprises:

a continuous ring of high strength material being located at one axial extremity of said second circular ring-like seal section and having a greater modulus of elasticity as compared to the modulus of elasticity of said second circular ring-like seal section and said continuous ring of high strength material being configured to reinforce said non-planar flexible transitional heel geometry against pressure induced movement toward said relatively rotatable surface.

10. The circular interference type extrusion resistant hydrodynamic seal of claim 8, wherein said means reinforcing comprises:

a quantity of reinforcing material being embedded within said second ring-like seal section and located in the circular region thereof adjacent said nonplanar flexible transitional heel geometry.

11. The circular interference type extrusion resistant hydrodynamic seal of claim 5, further comprising:

a static sealing lip projecting radially from said first circular ring-like seal section and being located in substantially radially opposed relation with said dynamic sealing lip.

12. The circular interference type extrusion resistant hydrodynamic seal of claim 11, wherein:

radial projection of said static sealing lip being substantially equal to nominal radial compression of said first circular ring-like seal section.

13. The circular interference type extrusion resistant hydrodynamic seal of claim 11, wherein:

said first and second ring-like seal sections defining a circular, non-cylindrical interface therebetween providing said second ring-like seal section with a greater radial thickness at said environment end thereof as compared with the radial thickness thereof at said lubricant end thereof.

14. The circular interference type extrusion resistant hydrodynamic seal of claim 11, wherein:

said non-planar flexible transitional heel geometry being of conical cross-sectional configuration.

15. The circular interference type extrusion resistant hydrodynamic seal of claim 11, further comprising:

means embedded within said second circular ring-like seal section at said non-planar flexible transitional heel geometry and reinforcing said second circular ring-like seal section adjacent said non-planar flexible transitional heel geometry to restrain high pressure displacement of said non-planar flexible transitional heel geometry toward the circular clearance between said housing and said relatively rotatable surface.

16. The circular interference type extrusion resistant hydrodynamic seal of claim 15, wherein said means reinforcing said second circular ring-like seal section comprises:

a quantity of reinforcing material being embedded within said second ring-like seal section and located in the circular region thereof adjacent said non-planar flexible transitional heel geometry.

17. The circular interference type extrusion resistant hydrodynamic seal of claim 16, wherein:

said quantity of reinforcing material being fibers having a greater modulus of elasticity as compared with the modulus of elasticity of said second circular ring-like seal section being embedded within said second circular ring-like seal section and being concentrated near said non-planar flexible transitional heel geometry.

18. The circular interference type extrusion resistant hydrodynamic seal of claim 16, wherein:

said quantity of reinforcing material being a fabric material having a greater modulus of elasticity as compared with the modulus of elasticity of said second circular ring-like seal section and being embedded within said second circular ring-like seal section and being concentrated near said non-planar flexible transitional heel geometry.

19. The circular interference type extrusion resistant hydrodynamic seal of claim 15, wherein said means reinforcing said second circular ring-like seal section comprises:

a continuous ring of material being located at one axial extremity of said second circular ring-like seal section and having a greater modulus of elasticity as compared to the modulus of elasticity of said second circular ring-like seal section, and said continuous ring of material being configured to reinforce said non-planar flexible transitional heel geometry against pressure induced movement toward said relatively rotatable surface.

20. A circular interference type extrusion resistant hydrodynamic seal for location within a housing defining a lubricant chamber and for dynamic sealing engagement with a relatively rotatable surface and for serving as a partition between the lubricant chamber and a contaminated environments and for serving to control seal deformation and interfacial contact force and thus regulate lubricant film thickness between the hydrodynamic seal and the relatively rotatable surfaces and having a lubricant end and an environment ends comprising:

(a) a first circular ring-like seal section being composed of resilient material and having a predetermined modulus of elasticity;

(b) a second circular ring-like seal section being composed of flexible material having a modulus of elasticity greater than said predetermined modulus of elasticity of said first circular ring-like seal section, said second circular ring-like seal section being connected integral with said first circular ring-like seal section and resisting pressure induced extrusion of said second circular ring-like seal section between the housing and the relatively rotatable surface;

(c) a circular dynamic sealing lip being defined by said second circular ring-like seal section and projecting radially therefrom, said circular dynamic sealing lip having a peripheral sealing surface for dynamic sealing engagement with said relatively rotatable surface and defining a hydrodynamic geometry at one axial extremity thereof having an axially varying hydrodynamic edge for facing said lubricant chamber and for hydrodynamically wedging a film of lubricant between said dynamic sealing lip and said relatively rotatable surface, said predetermined modulus of elasticity of said first circular ring-like seal section minimizing deformation of said dynamic sealing lip and minimizing interfacial contact force of said dynamic sealing lip with the relatively rotatable surface to control the thickness of the film of lubricant between said peripheral sealing surface and the relatively rotatable surface and to minimize generation of heat upon movement of the relatively rotatable surface;

(d) said first and second circular ring-like seal sections defining a circular end surface being oriented in substantially normal relation with said peripheral sealing surface and defining at least a portion of said environment end, said second circular ring-like seal section defining a non-planar flexible transitional heel geometry having a circular recess surface of concave cross-sectional configuration, said circular recess surface having circular intersection with said circular end surface radially remote from said peripheral sealing surface and having circular intersection with said peripheral sealing surface axially remote from said circular end surface; and (e) an abrupt axially nonvarying exclusionary geometry being defined at the opposite axial extremity of said dynamic sealing lip.

21. A circular interference type extrusion resistant hydrodynamic seal for location within a housing defining a lubricant chamber and for dynamic sealing engagement with a relatively rotatable surface and for serving as a partition between the lubricant chamber and a contaminated environment, and for serving to control seal deformation and interfacial contact force and thus regulate lubricant film thickness between the hydrodynamic seal and the relatively rotatable surface, comprising:

(a) a first circular ring-like seal section being composed of resilient material and having a predetermined modulus of elasticity;

(b) a second circular ring-like seal section being composed of flexible material having a modulus of elasticity greater than said predetermined modulus of elasticity of said first circular ring-like seal section, said second circular ring-like seal section being connected integral with said first circular ring-like seal section and resisting lubricant pressure induced extrusion of said second circular ring-like seal section between the housing and the relatively rotatable surface;

(c) a circular dynamic sealing lip being defined by said second circular ring-like seal section and projecting radially therefrom, said circular dynamic sealing lip having a peripheral sealing surface for dynamic sealing engagement with said relatively rotatable surface and defining a hydrodynamic geometry at one axial extremity thereof having an axially varying hydrodynamic edge for facing said lubricant chamber and for hydrodynamically wedging a film of lubricant between said dynamic sealing lip and said relatively rotatable surface and having an abrupt axially nonvarying exclusionary geometry at the other axial extremity thereof, said predetermined modulus of elasticity of said first circular ring-like seal section minimizing deformation of said dynamic sealing lip and minimizing interfacial contact force of said dynamic sealing lip with the relatively rotatable surface to control the thickness of the film of lubricant between said peripheral sealing surface and the relatively rotatable surface and to minimize generation of heat upon movement of the relatively rotatable surface: and (d) said first and second circular ring-like seal sections defining a circular end surface being oriented in substantially normal relation with said peripheral sealing surface and defining an environment end of said hydrodynamic seal, said second circular ring-like seal section defining a non-planar flexible transitional heel geometry of concave cross-sectional configuration and having circular intersection with said circular end surface radially remote from said peripheral sealing surface and having circular intersection with said peripheral sealing surface axially remote from said circular end surface.

22. A circular interference type extrusion resistant hydrodynamic seal for location within a housing defining a lubricant chamber and a circular static surface and adapted for dynamic sealing engagement with a relatively rotatable surface and for serving as a partition between the lubricant chamber and a contaminated environment and for serving to control interfacial contact force of said seal with the relatively rotatable surface and thus control the lubricant thickness between said seal and the relatively rotatable surface, comprising:

(a) a ring-like seal body of generally "C"-shaped cross-sectional configuration being composed of a flexible sealing material having a predetermined modulus of elasticity and defining a lubricant axial extremity and an environmental axial extremity, said ring-like seal body defining a circular body cavity being open toward said environment axial extremity of said ring-like seal body and defining radially inner and outer flexible seal body rims;

(b) a circular dynamic sealing lip being defined by said ring-like seal body and having an axially varying hydrodynamic geometry at one axial end thereof for facing said lubricant chamber, and for hydrodynamically wedging a film of lubricant between said dynamic sealing lip and said relatively rotatable surface, said circular dynamic sealing lip further defining a peripheral sealing surface for sealing engagement with said relatively rotatable surface; and (c) a ring-like core of resilient sealing material being located within said circular body cavity and defining a substantially circular axial end surface for facing the contaminated environment, said ring-like core of resilient material having a modulus of elasticity less than said predetermined modulus of elasticity and permitting flexing of said flexible seal body rims toward one another for minimizing interfacial contact force of said circular dynamic sealing lip with the relatively rotatable surface, thus regulating the thickness of said film of lubricant.

23. The circular interference type extrusion resistant hydrodynamic seal of claim 22, wherein:

said ring-like core of flexible sealing material being integral with said ring-like body of resilient sealing material.

24. The circular interference type extrusion resistant hydrodynamic seal of claim 22, wherein:

said ring-like core of resilient sealing material being composed of castable elastomeric material.

25. The circular interference type extrusion resistant hydrodynamic seal of claim 22, wherein:

said dynamic sealing lip having an abrupt axially non-varying exclusionary geometry at the axial end thereof opposite said axial end having said axially varying hydrodynamic geometry and being disposed for facing said environment end.

26. The circular interference type extrusion resistant hydrodynamic seal of claim 22, wherein:

a circular static sealing lip being defined by said ring-like seal body and being located in substantially radially opposed relation with said circular dynamic sealing lip.

27. A circular interference type extrusion resistant and lubricant film controlling hydrodynamic seal for location within a housing defining a lubricant chamber and a circumferential gland wall defining a circular static surface and a transverse gland wall for axial support of said extrusion resistant hydrodynamic seal, said circular interference type hydrodynamic seal being adapted for dynamic sealing engagement with the sealing surface of a relatively rotatable surface and for serving as a partition between the lubricant chamber and a contaminated environment, comprising:

(a) a ring-like seal body having an outer circular seal body section being composed of a resilient sealing material having a predetermined modulus of elasticity and having an inner annular seal body section being integral with said outer annular seal body section and being composed of a resilient material having a greater modulus of elasticity than said predetermined modulus of elasticity, said inner and outer annular seal body sections defining a lubricant axial extremity and an environment axial extremity;

(b) a circular hydrodynamic sealing lip being defined by said inner annular seal body section of said ring-like seal body and having an axially varying hydrodynamic geometry at one axial end of said circular dynamic sealing lip for facing said lubricant chamber and an axially non-varying exclusionary geometry at the other axial end thereof for facing the contaminated environment, said circular dynamic sealing lip further defining a generally cylindrical peripheral sealing surface for sealing engagement with said relatively-rotatable surface;

(c) wherein said inner annular seal body section of said ring-like seal body further defining a non-planar flexible transitional heel geometry intersecting said environment axial extremity and said circular dynamic sealing lip and defining extrusion resistant seal geometry to minimize pressure induced extrusion of said seal between said housing and said relatively rotatable surface; and (d) means, comprising said greater modulus of elasticity of said second circular ring-like seal section than said predetermined modulus of elasticity of said first circular ring-like seal section for minimizing contact force of said dynamic sealing lip of said second circular ring-like seal section with said relatively rotatable surface and minimizing compression induced distortion of said hydrodynamic geometry of said circular dynamic sealing lip for controlling hydrodynamic wedging of said film of lubricant and controlling the thickness of the film of lubricant between said peripheral sealing surface of said dynamic sealing lip and said relatively rotatable surface.

28. The circular interference type extrusion resistant hydrodynamic seal of claim 27, wherein:

a quantity of reinforcing material being embedded within said second circular ring-like seal body section of said ring-like seal body and being located in the circular region thereof adjacent said non-planar flexible transitional heel geometry to enhance the resistance of said ring-like seal body to said pressure induced extrusion.

* * * * *

UNITED STATES PATENT AND TRADEMARK OFFICE
CERTIFICATE OF CORRECTION

PATENT NO.    : 5,738,358
DATED         : April 14, 1998
INVENTOR(S)   : Kalsi et al.

It is certified that error appears in the above-identified patent and that said Letters Patent is hereby corrected as shown below:

<u>Title page,</u>
Delete title page to appear as per attached title page.

<u>Drawings,</u>
Figures 1-15 should be deleted to appear as per attached figures 1-15.

Signed and Sealed this

Sixth Day of August, 2002

Attest:

Attesting Officer

JAMES E. ROGAN
*Director of the United States Patent and Trademark Office*

United States Patent [19]

Kalsi et al.

[11] Patent Number: 5,738,358
[45] Date of Patent: Apr. 14, 1998

[54] EXTRUSION RESISTANT HYDRODYNAMICALLY LUBRICATED MULTIPLE MODULUS ROTARY SHAFT SEAL

[75] Inventors: Manmohan S. Kalsi, Houston; Lannie Dietle, Sugar Land, both of Tex.

[73] Assignee: Kalsi Engineering, Inc., Sugar Land, Tex.

[21] Appl. No.: 582,086

[22] Filed: Jan. 2, 1996

[51] Int. Cl.$^6$ .................................................. F16J 15/32
[52] U.S. Cl. ..................... 277/544; 277/556; 277/559; 277/584; 277/926
[58] Field of Search ............................... 277/134, 152, 277/165, 188 R

[56] References Cited

U.S. PATENT DOCUMENTS

| | | | |
|---|---|---|---|
| 930,230 | 8/1909 | Rhodes | 277/121 |
| 2,679,441 | 5/1954 | Stillwagon | 277/188 R |
| 2,998,288 | 8/1961 | Newhouse | 277/165 |
| 3,381,970 | 5/1968 | Brown | 277/165 |
| 3,627,337 | 12/1971 | Pippert | 277/206 |
| 3,901,517 | 8/1975 | Heathcott | 277/205 |
| 3,909,016 | 9/1975 | Traub et al. | 277/165 |
| 3,921,987 | 11/1975 | Johnston et al. | 277/134 |
| 3,942,806 | 3/1976 | Edlund | 277/165 |
| 4,484,753 | 11/1984 | Kalsi . | |
| 4,610,319 | 9/1986 | Kalsi . | |
| 4,917,390 | 4/1990 | Lee et al. | 277/165 |
| 5,195,754 | 3/1993 | Dietle . | |
| 5,230,520 | 7/1993 | Dietle et al. . | |
| 5,306,021 | 4/1994 | Morvant | 277/188 R |
| 5,433,452 | 7/1995 | Edlund et al. | 277/165 |

FOREIGN PATENT DOCUMENTS

| | | | |
|---|---|---|---|
| 1166648 | 11/1958 | France | 277/165 |
| 1574959 | 6/1990 | U.S.S.R. | 277/165 |
| 759233 | 10/1956 | United Kingdom | 277/165 |

OTHER PUBLICATIONS

*Seals and Sealing Handbook*, Gulf Publishing Co., Houston, TX., 1981, p. 171.

Seals and Sealing Handbook, pp. 177, Gulf Publishing Co., Houston, TX., 1981.

*Primary Examiner*—William A. Cuchlinski, Jr.
*Assistant Examiner*—John L. Beres
*Attorney, Agent, or Firm*—Bush, Riddle, & Jackson L.L.P.

[57] ABSTRACT

A hydrodynamically lubricated interference type rotary shaft seal suitable for environmental exclusion and high pressure lubricant retention which incorporates composite multiple modulus construction and a non-planar flexible environmental edge heel geometry which cooperate to resist high pressure extrusion damage while minimizing interfacial contact pressure and accommodating radial shaft motion.

28 Claims, 9 Drawing Sheets